US010876052B2

(12) United States Patent
Ramkumar et al.

(10) Patent No.: US 10,876,052 B2
(45) Date of Patent: Dec. 29, 2020

(54) COMPACT CONTACTING SYSTEMS AND METHODS FOR SCAVENGING SULFUR-CONTAINING COMPOUNDS

(71) Applicants: Shwetha Ramkumar, Cypress, TX (US); Donald P. Shatto, Houston, TX (US); P. Scott Northrop, The Woodlands, TX (US); Sean T. Philbrook, Houston, TX (US)

(72) Inventors: Shwetha Ramkumar, Cypress, TX (US); Donald P. Shatto, Houston, TX (US); P. Scott Northrop, The Woodlands, TX (US); Sean T. Philbrook, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 120 days.

(21) Appl. No.: 15/950,867

(22) Filed: Apr. 11, 2018

(65) Prior Publication Data

US 2018/0362858 A1 Dec. 20, 2018

Related U.S. Application Data

(60) Provisional application No. 62/522,432, filed on Jun. 20, 2017.

(51) Int. Cl.
*C10G 25/00* (2006.01)
*B01D 53/14* (2006.01)
*B01D 53/18* (2006.01)

(52) U.S. Cl.
CPC ....... *C10G 25/003* (2013.01); *B01D 53/1468* (2013.01); *B01D 53/1487* (2013.01); *B01D 53/18* (2013.01); *B01D 2252/20436* (2013.01); *B01D 2256/245* (2013.01); *B01D 2257/304* (2013.01); *B01D 2257/306* (2013.01); *C10G 2300/1025* (2013.01); *C10G 2300/207* (2013.01)

(58) Field of Classification Search
CPC .......... B01D 53/1468; B01D 2256/245; B01D 2257/304; B01D 2257/306
See application file for complete search history.

(56) References Cited

U.S. PATENT DOCUMENTS

| | | | | |
|---|---|---|---|---|
| 1,951,647 | A | 3/1934 | Cooke | 196/46 |
| 2,847,200 | A | 8/1958 | Ung | 202/158 |
| 3,767,766 | A | 10/1973 | Tjoa et al. | 423/220 |
| 3,773,472 | A | 11/1973 | Hausberg et al. | 422/169 |
| 3,989,811 | A | 11/1976 | Hill | 423/573 |
| 4,073,832 | A | 2/1978 | McGann | 261/118 |
| 4,204,934 | A | 5/1980 | Warren et al. | 204/186 |
| 4,318,717 | A | 3/1982 | Sohier | 55/71 |
| 4,369,167 | A | 1/1983 | Weir, Jr. | 423/210 |
| 4,405,580 | A | 9/1983 | Stogryn et al. | 423/226 |
| 4,421,725 | A | 12/1983 | Dezael et al. | 423/228 |
| 4,589,896 | A | 5/1986 | Chen et al. | 62/28 |
| 4,603,035 | A | 7/1986 | Connell et al. | 423/226 |
| 4,678,648 | A | 7/1987 | Wynn | 423/228 |
| 4,701,188 | A | 10/1987 | Mims | 55/20 |
| 4,752,307 | A | 6/1988 | Asmus et al. | 55/73 |
| 4,824,645 | A | 4/1989 | Jones et al. | 423/226 |
| 4,885,079 | A | 12/1989 | Eppig et al. | 208/13 |
| 5,067,971 | A | 11/1991 | Bikson et al. | 55/16 |
| 5,085,839 | A | 2/1992 | Scott et al. | 423/210 |
| 5,091,119 | A | 2/1992 | Biddulph et al. | 261/114.3 |
| 5,093,094 | A | 3/1992 | Van Kleek et al. | 423/224 |
| 5,186,836 | A | 2/1993 | Gauthier et al. | 210/512.1 |
| 5,209,821 | A | 5/1993 | Shaw et al. | 159/4.01 |
| 5,439,509 | A | 8/1995 | Spink et al. | 95/166 |
| 5,462,584 | A | 10/1995 | Gavlin et al. | 95/231 |
| 5,603,908 | A | 2/1997 | Yoshida et al. | 423/220 |
| 5,648,053 | A | 7/1997 | Mimura et al. | 423/210 |

(Continued)

FOREIGN PATENT DOCUMENTS

| | | | |
|---|---|---|---|
| CA | 2144585 | 6/1996 | B01D 53/52 |
| DE | 10162457 | 7/2003 | B01D 3/32 |

(Continued)

OTHER PUBLICATIONS

U.S. Appl. No. 62/548,171, filed Aug. 21, 2017, Denton, Robert D. et al.

U.S. Appl. No. 62/548,172, filed Aug. 21, 2017, Denton, Robert D. et al.

Carter, T. et al. (1998) "Addition of Static Mixers Increases Capacity in Central Texas Gas Plant," *Proc. of the 77th GPA Annual Conv.*, pp. 110-113.

Dow Chemical Company (Mar. 3, 2015) "Product Safety Assessment," *SELEXOL Solvents Product Brochure*, 3 pages.

Garrison, J. et al. (2002) "Keyspan Energy Canada Rimbey Acid Gas Enrichment with FLEXSORB SE PLUS Technology," *Proceedings 2002 Laurance Reid Gas Conditioning Conf.*, Norman, OK, 8 pgs.

(Continued)

*Primary Examiner* — Randy Boyer

(74) *Attorney, Agent, or Firm* — ExxonMobil Upstream Research Company—Law Department

(57) ABSTRACT

A hydrogen sulfide ($H_2S$) scavenging system for removing $H_2S$, mercaptans, and/or other sulfur-containing compounds from a natural gas stream. A co-current contacting system is located in-line within a pipe and receives the natural gas stream and a liquid scavenger stream. The co-current contacting system includes a co-current contactor including a droplet generator and a mass transfer section. The droplet generator generates droplets from the liquid scavenger stream and disperses the droplets into the natural gas stream. The mass transfer section provides a mixed, two-phase flow having a vapor phase and a liquid phase. The liquid phase includes the liquid scavenger stream with $H_2S$, mercaptans, and/or other sulfur-containing compounds absorbed from the natural gas stream, and the vapor phase includes the natural gas stream. A separation system separates the vapor phase from the liquid phase.

14 Claims, 9 Drawing Sheets

(56) References Cited

U.S. PATENT DOCUMENTS

| | | | | |
|---|---|---|---|---|
| 5,664,426 | A | 9/1997 | Lu | 62/93 |
| 5,713,985 | A | 2/1998 | Hamilton | 95/90 |
| 5,735,936 | A | 4/1998 | Minkkinen et al. | 95/49 |
| 5,810,897 | A | 9/1998 | Konosu | 55/418 |
| 5,837,105 | A | 11/1998 | Stober et al. | 203/40 |
| 5,907,924 | A | 6/1999 | Collin et al. | 45/194 |
| 5,988,283 | A | 11/1999 | Gann | 166/357 |
| 6,063,163 | A | 5/2000 | Carmody | 95/187 |
| 6,071,484 | A | 6/2000 | Dingman et al. | 423/229 |
| 6,089,317 | A | 7/2000 | Shaw | 166/265 |
| 6,214,097 | B1 | 4/2001 | Laslo | 96/236 |
| 6,228,145 | B1 | 5/2001 | Falk-Pedersen et al. | 95/44 |
| 6,284,023 | B1 | 9/2001 | Torkildsen et al. | 95/216 |
| 6,830,608 | B1 | 12/2004 | Peters | 261/112 |
| 6,881,389 | B2 | 4/2005 | Paulsen et al. | 423/210 |
| 7,018,451 | B1 | 3/2006 | Torkildsen et al. | 95/216 |
| 7,128,276 | B2 | 10/2006 | Nilsen et al. | 236/124 |
| 7,144,568 | B2 | 12/2006 | Ricard et al. | 423/659 |
| 7,152,431 | B2 | 12/2006 | Amin et al. | 62/637 |
| 7,175,820 | B2 | 2/2007 | Minkkinen et al. | 423/228 |
| RE39,826 | E | 9/2007 | Lu | 62/632 |
| 7,273,513 | B2 | 9/2007 | Linga et al. | 95/235 |
| 7,560,088 | B2 | 7/2009 | Keller et al. | 423/537.1 |
| 7,811,343 | B2 | 10/2010 | Toma | 55/318 |
| 8,071,046 | B2 | 12/2011 | Hassan et al. | 422/225 |
| 8,137,444 | B2 | 3/2012 | Farsad et al. | 96/235 |
| 8,240,640 | B2 | 8/2012 | Nakayama | 261/109 |
| 8,268,049 | B2 | 9/2012 | Davydov | 95/199 |
| 8,336,863 | B2 | 12/2012 | Neumann et al. | 261/115 |
| 8,343,360 | B2 | 1/2013 | Schook | 210/788 |
| 8,454,727 | B2 | 6/2013 | Dunne et al. | 95/51 |
| 8,475,555 | B2 | 7/2013 | Betting et al. | 55/416 |
| 8,652,237 | B2 | 2/2014 | Heldebrant et al. | 95/235 |
| 8,741,127 | B2 | 6/2014 | Koseoglu et al. | 20/57 |
| 8,899,557 | B2 | 12/2014 | Cullinane et al. | 96/234 |
| 8,900,347 | B2 | 12/2014 | Boulet et al. | 95/114 |
| 9,149,761 | B2 | 10/2015 | Northrop et al. | 166/401 |
| 9,192,896 | B2 | 11/2015 | Hassan et al. | B01F 7/00766 |
| 9,238,193 | B2 | 1/2016 | Ji et al. | B01D 53/1468 |
| 9,353,315 | B2 | 5/2016 | Heath et al. | C10G 5/06 |
| 9,599,070 | B2 | 3/2017 | Huntington et al. | 60/39 |
| 9,764,252 | B2 | 9/2017 | Whitney et al. | B01D 17/0217 |
| 9,902,914 | B2 | 2/2018 | Mak | C10L 3/104 |
| 2001/0037876 | A1 | 11/2001 | Oost et al. | 165/133 |
| 2003/0005823 | A1 | 1/2003 | LeBlanc et al. | 95/149 |
| 2003/0155438 | A1 | 8/2003 | Boee et al. | 239/533.2 |
| 2004/0092774 | A1 | 5/2004 | Mimura et al. | 564/497 |
| 2005/0006086 | A1 | 1/2005 | Gramme | 166/105.5 |
| 2006/0123993 | A1 | 6/2006 | Henriksen | 96/234 |
| 2006/0185320 | A1 | 8/2006 | Dureiko | 52/749 |
| 2007/0205523 | A1 | 9/2007 | Kojima | 261/79.2 |
| 2008/0006011 | A1 | 1/2008 | Larnholm et al. | 55/421 |
| 2008/0107581 | A1 | 5/2008 | Sparling et al. | 423/222 |
| 2008/0115532 | A1 | 5/2008 | Jager | 62/620 |
| 2008/0190291 | A1 | 8/2008 | Krehbiel et al. | 95/241 |
| 2008/0257788 | A1 | 10/2008 | Leito | 209/44 |
| 2008/0290021 | A1 | 11/2008 | Buijs et al. | 210/500.27 |
| 2009/0213687 | A1 | 8/2009 | Linga et al. | 366/167.2 |
| 2009/0241778 | A1 | 10/2009 | Lechnick et al. | 95/177 |
| 2010/0229725 | A1 | 9/2010 | Farsad et al. | 96/74 |
| 2011/0036122 | A1 | 2/2011 | Betting et al. | 62/636 |
| 2011/0168019 | A1 | 7/2011 | Northrop et al. | 95/186 |
| 2011/0185633 | A1 | 8/2011 | Betting et al. | 48/127.5 |
| 2011/0217218 | A1 | 9/2011 | Gupta | 423/228 |
| 2011/0296869 | A1 | 12/2011 | Buhrman et al. | 62/617 |
| 2012/0060691 | A1 | 3/2012 | Bieri et al. | 95/270 |
| 2012/0240617 | A1 | 9/2012 | Weiss et al. | 62/611 |
| 2013/0017144 | A1 | 1/2013 | Menzel | 423/542 |
| 2014/0033921 | A1 | 2/2014 | Peck et al. | 95/269 |
| 2014/0123851 | A1 | 5/2014 | Jamtvedt et al. | 95/149 |
| 2014/0245889 | A1 | 9/2014 | Hamre et al. | 95/223 |
| 2014/0331862 | A1 | 11/2014 | Cullinane et al. | 95/186 |
| 2014/0335002 | A1 * | 11/2014 | Northrop | B01D 45/16 423/228 |
| 2014/0366446 | A1 | 12/2014 | Sharma et al. | 48/127.3 |
| 2014/0373714 | A1 | 12/2014 | Cloud et al. | 95/273 |
| 2015/0013539 | A1 | 1/2015 | Eriksen et al. | 95/172 |
| 2015/0083425 | A1 | 3/2015 | Sullivan et al. | |
| 2015/0135954 | A1 | 5/2015 | Li et al. | |
| 2015/0191360 | A1 | 7/2015 | Weiss et al. | C01B 31/20 |
| 2015/0267871 | A1 | 9/2015 | Murray, Sr. et al. | F17D 3/01 |
| 2015/0322580 | A1 | 11/2015 | Little | 205/554 |
| 2015/0352463 | A1 | 12/2015 | Grave et al. | 95/219 |
| 2016/0060190 | A1 | 3/2016 | Trucko et al. | C07C 7/005 |
| 2016/0136569 | A1 | 5/2016 | Lee et al. | B01D 53/18 |
| 2016/0199774 | A1 | 7/2016 | Grave et al. | 95/235 |
| 2016/0236140 | A1 | 8/2016 | Northrop et al. | 95/210 |
| 2016/0263516 | A1 | 9/2016 | Freeman et al. | 95/236 |
| 2017/0145803 | A1 | 5/2017 | Yeh et al. | E21B 43/36 |
| 2017/0157553 | A1 | 6/2017 | Northrop et al. | 96/314 |
| 2017/0184021 | A1 | 6/2017 | Huntington et al. | F02C 3/34 |
| 2017/0239612 | A1 | 8/2017 | Mondkar et al. | 423/220 |
| 2018/0071674 | A1 | 3/2018 | Freeman et al. | 423/228 |
| 2018/0361307 | A1 | 12/2018 | Yeh et al. | B01D 53/1406 |
| 2018/0361309 | A1 | 12/2018 | Yeh et al. | B01D 53/185 |
| 2018/0362858 | A1 | 12/2018 | Ramkumar et al. | C10G 25/003 |

FOREIGN PATENT DOCUMENTS

| | | | |
|---|---|---|---|
| EP | 0191985 | 8/1986 | B01D 53/18 |
| EP | 0301623 | 2/1989 | B01D 53/14 |
| EP | 1438484 | 4/2003 | B01D 17/02 |
| EP | 1141520 | 5/2003 | E21B 43/40 |
| EP | 1340536 | 9/2003 | B01J 19/30 |
| EP | 2134446 | 9/2015 | B01D 54/04 |
| GB | 1234862 | 6/1971 | B01D 53/18 |
| GB | 1377026 | 12/1974 | B01D 47/10 |
| GB | 1579249 | 11/1980 | H01J 1/13 |
| GB | 2079177 | 1/1982 | B01D 53/18 |
| GB | 2094951 | 9/1982 | F22B 3/04 |
| GB | 2414688 | 12/2006 | B01D 53/26 |
| JP | 48-066073 | 9/1971 | B01D 47/10 |
| JP | 53-032109 | 3/1978 | A61K 9/08 |
| JP | 06-170153 | 12/1992 | B01D 53/34 |
| JP | 2014-000500 | 1/2014 | B01D 53/14 |
| WO | WO1993/010883 | 6/1993 | B01D 53/14 |
| WO | WO1997/046304 | 12/1997 | B01D 53/26 |
| WO | WO1999/013966 | 3/1999 | B01D 53/18 |
| WO | WO2000/056844 | 9/2000 | C10L 3/10 |
| WO | WO2002/032536 | 4/2002 | B01D 17/00 |
| WO | WO2003/072226 | 9/2003 | B01D 53/14 |
| WO | WO2004/070297 | 8/2004 | F25J 3/06 |
| WO | WO2009/140993 | 11/2009 | B01D 45/16 |
| WO | WO2011/053400 | 5/2011 | F25J 3/00 |
| WO | WO2013/136310 | 9/2013 | B01D 53/14 |
| WO | WO2014/042529 | 3/2014 | |
| WO | WO2014/094794 | 6/2014 | B01D 17/04 |
| WO | WO2014/106770 | 7/2014 | |
| WO | WO2015/013539 | 1/2015 | H04W 52/36 |
| WO | WO2015/105438 | 7/2015 | B01D 53/14 |
| WO | WO2015/167404 | 11/2015 | B01D 53/22 |
| WO | WO2016/064825 | 4/2016 | B01D 53/48 |
| WO | WO2016/156834 | 10/2016 | B01D 53/14 |

OTHER PUBLICATIONS

Hanna, James M. (2009) "Qatargas Expansion Projects: Why Change the Gas Treating Concept from Sulfinol-D?," *OSGAT 2009 Proceedings 5th Int'l Conf.*, Mar. 31-Apr. 1, Abu Dhabi, UAE, 33 pgs.

Jones, S. G. et al. (2004) "Design, Cost & Operation of an Acid Gas Enrichment & Injection Facility," *Proceedings 2004 Laurance Reid Gas Conditioning Conf.*, Norman, OK, 43 pgs.

Linga, H. et al. (2001) "New Selective $H_2S$ Removal Process for the Refining Industry," *Nat'l Petrochemical & Refiners Assoc.*, AM-01-35, 9 pgs.

Linga, H. et al. (2006) "Potentials and Applications for the Pro-Pure Co-Current Contactors," *13th Annual India Oil & Gas Rev. Symp.*, Mumbai, India, 24 pgs.

Nilsen, F. et al. (2001) "Selective $H_2S$ Removal in 50 Milliseconds," *Gas Processors Assoc., Europe Annual Conference*, 12 pgs.

(56) References Cited

OTHER PUBLICATIONS

Nilsen, F. et al. (2002) "Novel Contacting Technology Selectively Removes $H_2S$," *Oil & Gas Journal.*, 17 pgs.
Nilsen, F. et al. (2002) "Selective $H_2S$ Removal Applications using Novel Contacting Technology," *Gas Processors Assoc.*, 13 pgs.
Nova Molecular Technologies, Inc. (Jul. 17, 2008) "Product Brochure," *FLEXSORB SE*, 1 page.
ProSep, Inc. (2007) "Selective $H_2S$-Removal with Amines (ProCap)," *Product Brochure*, 32 pgs.
ProSep, Inc. (2014) "ProDry," *Gas Portfolio Product Brochure*, 1 pg.
ProSep, Inc. (2014) "ProScav," *Gas Portfolio Product Brochure*, 1 pg.
Puukilainen, E. et al. (2007) "Superhydrophobic Polyolefin Surfaces: Controlled Micro- an Nanostructures," *Dept. of Chemistry, Univ. of Joensuu*, Langmuir, v. 23, No. 13, pp. 7263-7268.
Royan, T. et al. (1992) "Acid Gas Enrichment using FLEXSORB," *Proceedings 1992 Laurance Reid Gas Conditioning Conf.*, Norman, OK, Mar. 2-4, 17 pgs.
Schutte & Koerting (2012) "Gas Scrubbers," *Product Brochure*, 14 pgs.
Smith, W. B. (2010) "Typical Amine and Glycol Treating Unit Compared to Gas Membrane Separation System for Wellhead $CO_2$ Trimming," *Laurance Reid Gas Conditioning Conf.*, Norman, OK, Feb. 21-24, 2010, pp. 417-436.
True, Warran R. (1994) "New Mobile Bay Complex Exploits Major Sour Gas Reserve," *Oil & Gas Journal*, v. 92, No. 21, 4 pgs.
Weiland, R. H. (2008) "Acid Gas Enrichment—Maximizing Selectivity," *Proceedings 2008 Laurance Reid Gas Conditioning Conf.*, Clarita, OK, 16 pgs.

* cited by examiner 200
218
206
220
217
204
300
308
208
210
202

COMPACT CONTACTING SYSTEMS AND METHODS FOR SCAVENGING SULFUR-CONTAINING COMPOUNDS

CROSS REFERENCE TO RELATED APPLICATIONS

This application claims the priority benefit of U.S. Patent Application No. 62/522,432 filed Jun. 20, 2017 entitled COMPACT CONTACTING SYSTEMS AND METHODS FOR SCAVENGING SULFUR-CONTAINING COMPOUNDS, the entirety of which is incorporated by reference herein.

FIELD

The present techniques provide methods and systems for gas treatment. More specifically, the present techniques provide for methods and systems to remove or scavenge sulfur containing compounds, including hydrogen sulfide and/or mercaptans, from a gas stream using compact co-current contacting systems.

BACKGROUND

This section is intended to introduce various aspects of the art, which can be associated with exemplary examples of the present techniques. This description is believed to assist in providing a framework to facilitate a better understanding of particular aspects of the present techniques. Accordingly, it should be understood that this section should be read in this light, and not necessarily as admissions of prior art.

Hydrogen sulfide ($H_2S$) scavenging is a process for removing $H_2S$ from a gas stream, such as a natural gas stream. $H_2S$ scavenging with non-regenerable solid or liquid sorbents is typically economical for removal of low levels of $H_2S$ from the gas stream. Some commercial hydrogen sulfide scavengers include Triazine, Caustic, Alkali, Nitrite, Formaldehyde, Ethanedial, Amine Sulfide, etc. Triazine is one of the liquid based scavengers used extensively in the oil and gas industry for $H_2S$ and low molecular weight mercaptans removal, while caustic is used to a lesser extent. There are several processes used for the application of triazine scavengers including direct injection into pipelines, using batch contact towers, or continuous contact systems. Direct injection of triazine into a pipeline requires the least capital investment, but because of ineffective contact between the triazine and the gas, a higher triazine injection rate is required. Additionally, direct pipeline injection of triazine may form scale on the inner wall of the pipeline, and the constant need to remove the scale further increases operating costs and downtime. In batch contact towers, the gas stream flows down in solid media and up in the form of bubbles in the triazine scavenger. This is better than direct injection and the associated capital costs are reasonable; however, the batch contact towers must be changed frequently, which increases downtime. The use of two towers in a lead-lag arrangement reduced downtime but will double capital costs. The use of these towers also necessitates a large inventory of chemical to be stored on site.

Continuous contact systems (often called flooded systems) are currently the most common processes used as they are flexible, have lower capital costs than typical lead-lag batch contact tower process, and are designed to operate continuously and automatically. Continuous contact systems also use a lower quantity of solvent compared to the other processes. FIG. 1 schematically depicts a known continuous contact system 100 using triazine to separate $H_2S$ from a natural gas stream 102 or other gas stream. A fresh triazine stream 104 from a fresh triazine supply tank 106 is pumped, using parallel first and second pumps 108, 110, to be sprayed or otherwise injected into the natural gas stream 102 at an injection point 111. The combined gas/triazine stream is sent to a contactor 112, which is designed to provide sufficient contacting time for the triazine to react and become enriched with the $H_2S$ in the gas stream. A mixed stream 114, comprising the gas in the natural gas stream 102 and the enriched triazine (also known as spent triazine), is next sent to a separator 116, where a spent triazine stream 117 exits a bottom of the separator and is stored in a spent triazine tank 118. A separated gas stream 120 exits the top of the separator 116. An analyzer 122 samples the separated gas stream 120 and controls the first and second pumps 108, 110 to provide the desired amount of fresh triazine to the natural gas stream 102. Because of the action of the triazine, the separated gas stream 120 has a substantially lower $H_2S$ content than gas stream 102. While system 100 requires less triazine than other known scavenging technologies, the contactor 112 and separator 116 are large and heavy vessels. The use of such vessels in situations that require or benefit from reduced height and/or weight characteristics, such as remote onshore applications, topsides facilities on offshore and floating applications, and subsea processing, may make the use of system 100 prohibitive. What is needed is a method and apparatus for removing $H_2S$ from a gas stream that reduces the capital costs and expenditures associated with known scavenging technologies. What is also needed is a method and apparatus for removing $H_2S$ from a gas stream that can be used in situations that require or benefit from reduced height and/or weight characteristics.

An operating issue typically associated with $H_2S$ scavenging using triazine includes the formation of dithiazine, which has a propensity to form solids in aqueous solution. Dithiazine forms solids from solutions which become oversaturated with dithiazine due to changes in temperature. These solids could deposit on walls of equipment or pipes leading to lower scavenging efficiencies and plugging. A common method to prevent formation of dithiazine is to use most of the capacity of the triazine but not to the maximum extent and to switch of the triazine solvent (for batch operations) or increase make up (for continuous systems) when breakthrough of $H_2S$ begins. What is needed is a contacting system design that limits the contact time of the solvent with the gas, thereby reducing solids formation.

Caustic is also a non-regenerable $H_2S$ scavenger, but it may react irreversibly with $CO_2$. Thus, reducing the contact time between the gas and the caustic would be important in applications containing significant $CO_2$. Nitrites, polyols, and other chemicals have also been used as $H_2S$ scavengers.

Other contaminants that may be beneficially removed with triazines or caustic are mercaptans. Mercaptans may occur to the level of 1,000 or 2,000 ppm in some raw gases, but they are not picked up to a great extent by amines. Physical solvents, or hybrid solvents (mixtures of chemical and physical solvents) are sometimes used to remove mercaptans from raw gas. However, these solvents tend to co-absorb significant amounts of heavy hydrocarbons, resulting in significant BTU loss of the gas. Alternatively, amines, followed by large-pore mole sieves, can used to remove these organic sulfur compounds, but this compound process is operationally complex. On the other hand, caustic reacts directly with mercaptans, as triazines do to some extent. What is needed is a way to remove mercaptans from a gas stream using caustic or other sulfur scavengers.

SUMMARY

The disclosed aspects include a hydrogen sulfide ($H_2S$) scavenging system for removing $H_2S$, mercaptans, and/or other sulfur-containing compounds from a natural gas stream. A co-current contacting system is located in-line within a pipe and receives the natural gas stream and a liquid scavenger stream. The co-current contacting system includes a co-current contactor including a droplet generator and a mass transfer section. The droplet generator generates droplets from the liquid scavenger stream and disperses the droplets into the natural gas stream. The mass transfer section provides a mixed, two-phase flow having a vapor phase and a liquid phase. The liquid phase includes the liquid scavenger stream with $H_2S$, mercaptans, and/or other sulfur-containing compounds absorbed from the natural gas stream, and the vapor phase includes the natural gas stream. A separation system separates the vapor phase from the liquid phase.

The disclosed aspects also include a method of removing $H_2S$, mercaptans, and/or other sulfur-containing compounds from a natural gas stream. The natural gas stream and a liquid scavenger stream are received in a co-current contacting system located in-line within a pipe. The co-current contacting system includes a droplet generator and a mass transfer section. Using the droplet generator, droplets are generated from the liquid scavenger stream and dispersed into the natural gas stream. Using the mass transfer section, a mixed, two-phase flow is provided having a vapor phase and a liquid phase. The liquid phase includes the liquid scavenger stream with $H_2S$, mercaptans, and/or other sulfur-containing compounds absorbed from the natural gas stream. The vapor phase includes the natural gas stream. The vapor phase is separated from the liquid phase.

DESCRIPTION OF THE DRAWINGS

The advantages of the present techniques are better understood by referring to the following detailed description and the attached drawings, in which.

DETAILED DESCRIPTION

Figure 1:
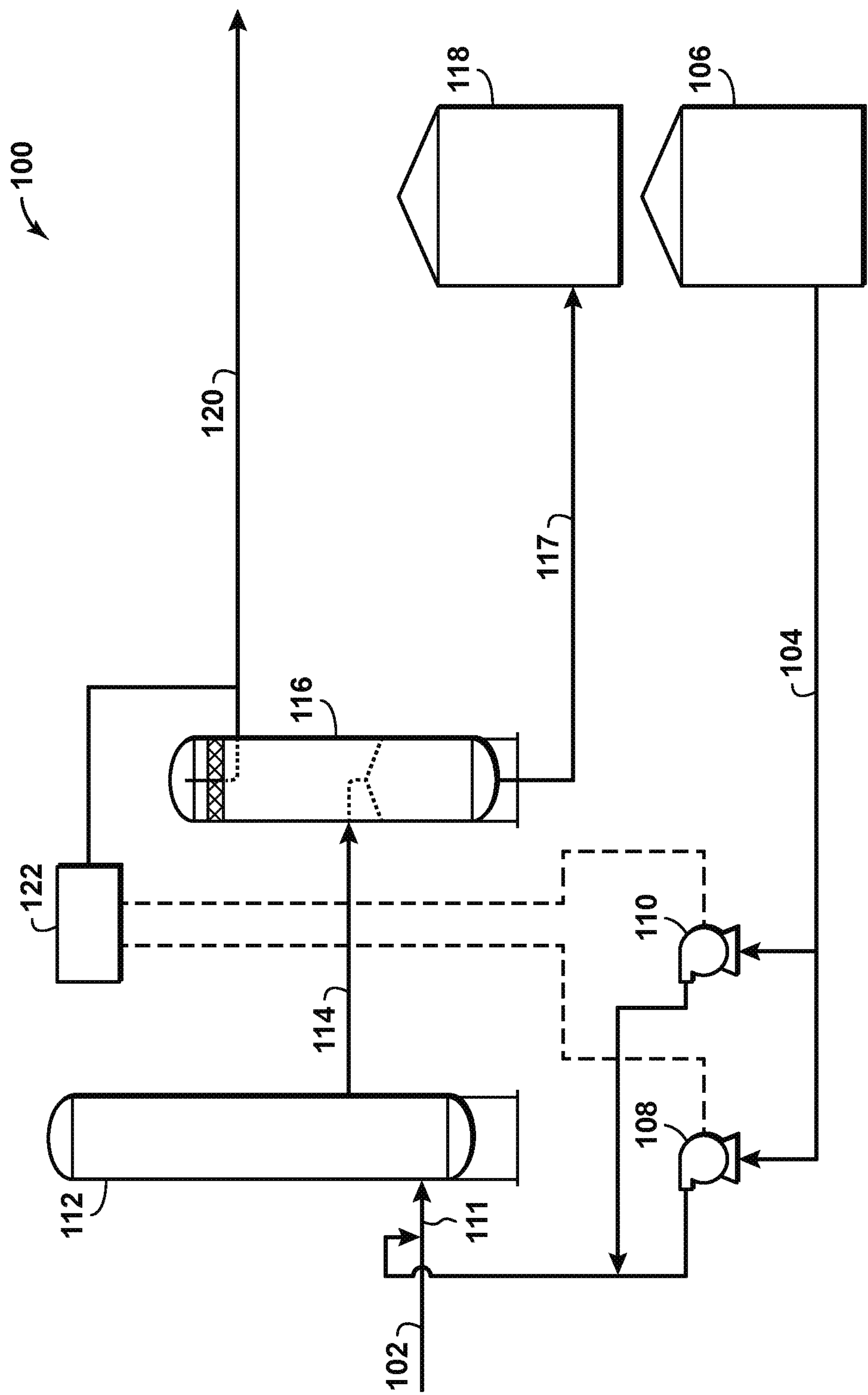
FIG. 1 is a schematic diagram of a known $H_2S$ scavenging system.

In the following detailed description section, non-limiting examples of the present techniques are described. However, to the extent that the following description is specific to a particular example or a particular use of the present techniques, this is intended to be for exemplary purposes only and simply provides a description of the exemplary examples. Accordingly, the techniques are not limited to the specific examples described below, but rather, include all alternatives, modifications, and equivalents falling within the true spirit and scope of the appended claims.

At the outset, for ease of reference, certain terms used in this application and their meanings as used in this context are set forth. Further, the present techniques are not limited by the usage of the terms shown below, as all equivalents, synonyms, new developments, and terms or techniques that serve the same or a similar purpose are considered to be within the scope of the present claims.

"Acid gas" refers to any gas that produces an acidic solution when dissolved in water. Non-limiting examples of acid gases include hydrogen sulfide ($H_2S$), carbon dioxide ($CO_2$), sulfur dioxide ($SO_2$), carbon disulfide ($CS_2$), carbonyl sulfide (COS), mercaptans (RSH), or mixtures thereof.

"Other sulfur-containing compounds" include carbon disulfide ($CS_2$), carbonyl sulfide (COS), mercaptans (RSH), or mixtures thereof.

As used herein, "caustic" means sodium hydroxide (NaOH).

"Co-current contactor" refers to a vessel that receives a gas stream and a separate solvent stream in such a manner that the gas stream and the solvent stream contact one another while flowing in generally the same direction.

The term "co-current" or "co-currently" refers to the internal arrangement of process streams within a unit operation that can be divided into several sub-sections by which the process streams flow in the same direction.

As used herein, the term "facility" is used as a general term to encompass oil and gas field gathering systems, processing platform systems, and well platform systems.

The term "gas" is used interchangeably with "vapor," and is defined as a substance or mixture of substances in the gaseous state as distinguished from the liquid or solid state. Likewise, the term "liquid" means a substance or mixture of substances in the liquid state as distinguished from the gas or solid state.

A "hydrocarbon" is an organic compound that primarily includes the elements hydrogen and carbon, although nitrogen, sulfur, oxygen, metals, or any number of other elements can be present in small amounts. As used herein, hydrocarbons generally refer to components found in natural gas, oil, or chemical processing facilities.

With respect to fluid processing equipment, the term "in series" means that two or more devices are placed along a flow line such that a fluid stream undergoing fluid separation moves from one item of equipment to the next while maintaining flow in a substantially constant downstream direction. Similarly, the term "in line" means that two or more components of a fluid mixing and separating device are connected sequentially or, more preferably, are integrated into a single tubular device. Similarly, the term "in parallel" means that a stream is divided among two or more devices, with a portion of the stream flowing through each of the devices.

The term "stream" indicates a material that is flowing from a first point, such as a source, to a second point, such as a device processing the stream. The stream may include any phase or material, but is generally a gas or liquid. The stream may be conveyed in a line or pipe, and used here, reference to the line or pipe also refers to the stream the line is carrying, and vice versa.

"Mercaptans" are substituted forms of $H_2S$ in which a hydrocarbyl moiety, R, takes the place of one of the hydrogen atoms. Their general formula is RSH. The properties of mercaptans depend substantially on the length of the hydrocarbon chain. Mercaptans in aqueous solution likewise act as acids, but are significantly weaker than $H_2S$. With increasing length of the hydrocarbon chain, therefore, mercaptans behave like hydrocarbons, which make their removal from hydrocarbon gas streams particularly difficult because the physical or chemical solvent prefers to take out the $H_2S$ and or $CO_2$.

"Natural gas" refers to a multi-component gas obtained from a crude oil well or from a subterranean gas-bearing formation. The composition and pressure of natural gas can vary significantly. A typical natural gas stream contains methane ($CH_4$) as a major component, i.e., greater than 50 mol % of the natural gas stream is methane. The natural gas stream can also contain ethane ($C_2H_6$), heavy hydrocarbons (e.g., $C_3$-$C_{20}$ hydrocarbons), one or more acid gases, or any combinations thereof. The natural gas can also contain minor amounts of contaminants such as water, nitrogen, iron sulfide, wax, crude oil, or any combinations thereof. The natural gas stream can be substantially purified, so as to remove compounds that may act as poisons.

"Scavenging" refers to the removal of a contaminant with a non-regenerable material.

An "$H_2S$ scavenger" is a liquid or solid non-regenerable sorbent used to remove $H_2S$ and/or other sulfur-containing compounds. Non-limiting examples of $H_2S$ scavengers include polyamines (such as triazine), caustic, alkali, nitrite, formaldehyde, ethanedial, amine sulfide, etc. An "$H_2S$ scavenging system" is a system that uses an $H_2S$ scavenger to remove $H_2S$ and/or other sulfur-containing compounds.

"Substantial" when used in reference to a quantity or amount of a material, or a specific characteristic thereof, refers to an amount that is sufficient to provide an effect that the material or characteristic was intended to provide. The exact degree of deviation allowable may depend, in some cases, on the specific context.

The present techniques provide for the scavenging of $H_2S$ and related mercaptans from gas streams, such as natural gas streams, using one or more co-current contacting systems in a continuous contacting process or system. The co-current contacting systems disclosed herein include stages composed primarily of in-line devices, or of bundles of parallel in-line devices, in either case the devices and/or the bundles having smaller diameters than a conventional contactor or separator.

Known continuous contacting systems, such as the system 100 of FIG. 1, require comparatively low velocities to avoid entrainment of the down-flowing liquid in the natural gas stream. Further, relatively long distances are useful for disengagement of the $H_2S$ from the natural gas stream 102. Depending on the flow rate of the gas stream, the contactor 112 may be greater than four meters in diameter and more than 30 meters tall. For high-pressure applications, the contactor vessel has thick, metal walls. Consequently, the contactor 112 can be large and very heavy, and for similar reasons the separator 116 may be similarly dimensioned. Having large and heavy contactors and separators is generally undesirable, particularly for offshore gas processing applications, and may not be feasible for other applications.

The disclosed aspects use one or more co-current contacting systems, arranged in a co-current flow scheme, to contact a scavenging sorbent with a gas stream and separate the enriched sorbent from the gas stream. Specifically, the disclosed aspects use one or more co-current contacting systems with triazine-based scavengers to remove $H_2S$ and related mercaptans from natural gas. In an aspect, one or more co-current contacting systems may be connected in series within a pipe. The gas stream, which may be a natural gas stream, and the sorbent may move together, i.e., co-currently, within each co-current contacting system. In general, co-current contactors can operate at much higher fluid velocities than the fluid velocities used in known contactors and separators, co-current contacting systems tend to be smaller than known scavenging contactors that may include packing or trays. Further, the co-current contacting systems are smaller than conventional pressure vessels of equivalent processing capacity, and are thus more suited to modular design/construction, offshore deployment, subsea applications, arctic applications, remote applications, de-bottlenecking applications, and applications where visual pollution may be a factor. In many cases, two to three co-current contacting systems in series can be used to effectively scavenge $H_2S$ from a natural gas stream.

Figure 2:
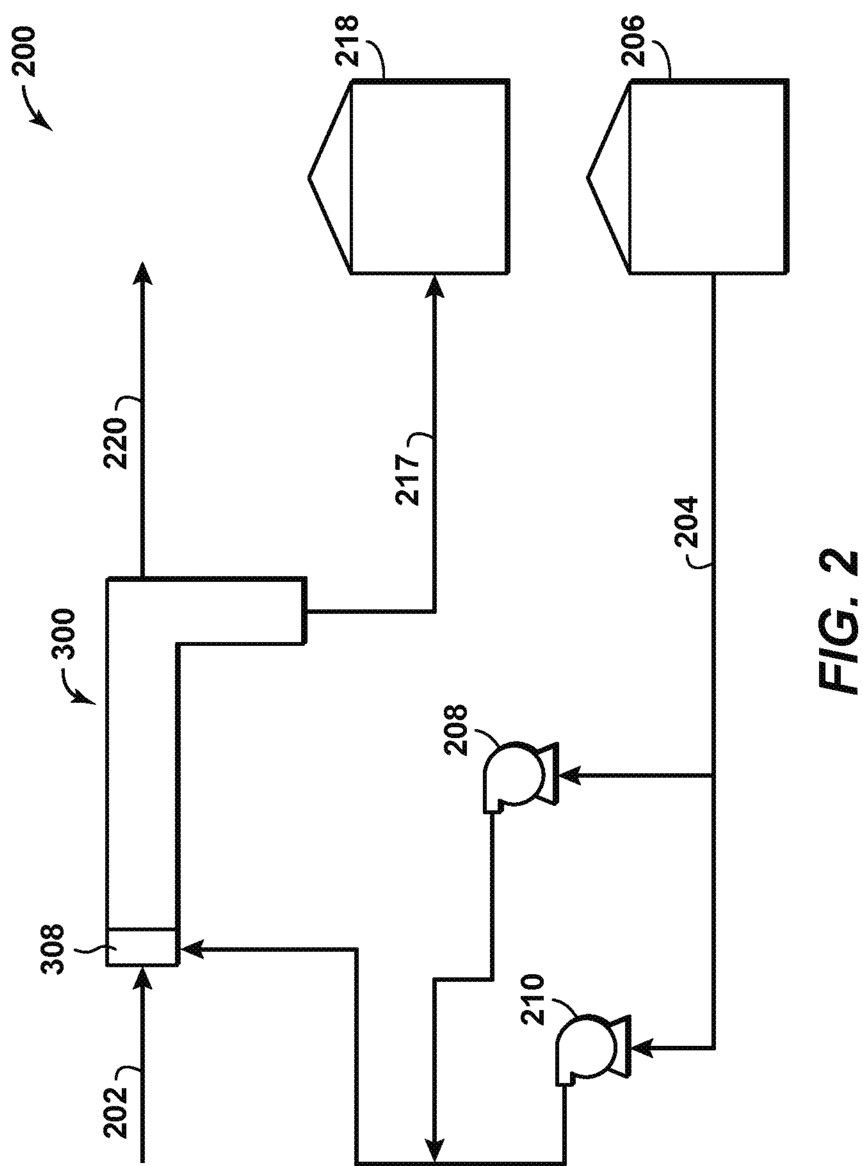
FIG. 2 is a schematic diagram of an $H_2S$ scavenging system using a co-current contacting system according to disclosed aspects.

FIG. 2 is a schematic diagram of an $H_2S$ scavenging system 200 using a co-current contacting system 300 according to disclosed aspects. System 200 uses a liquid scavenger, or an $H_2S$ scavenger such as triazine, to separate $H_2S$ from a natural gas stream 202 or other gas stream. The mention of specific liquid scavengers in the aspects described herein and shown in the Figures is non-limiting. It is within the scope of the disclosure to employ any suitable $H_2S$ scavenger in the described aspects and Figures herein. A fresh triazine stream 204 from a fresh triazine supply tank 206 is pumped, using parallel first and second pumps 208, 210, to be injected into the natural gas stream 202 using a droplet generator 308 associated with the co-current contacting system 300. The co-current contacting system 300, as will be further described herein, provides sufficient contacting time for the triazine to react and absorb part or all of the $H_2S$ in the natural gas stream. The triazine, now having absorbed the $H_2S$, exits the co-current contacting system 300 as a spent triazine stream 217 that is sent to a spent triazine tank 218. The spent triazine may be stored or otherwise disposed of according to known principles. The natural gas stream, now having $H_2S$ removed therefrom, exits the co-current contacting system 300 as a processed gas stream 220.

Figure 3:
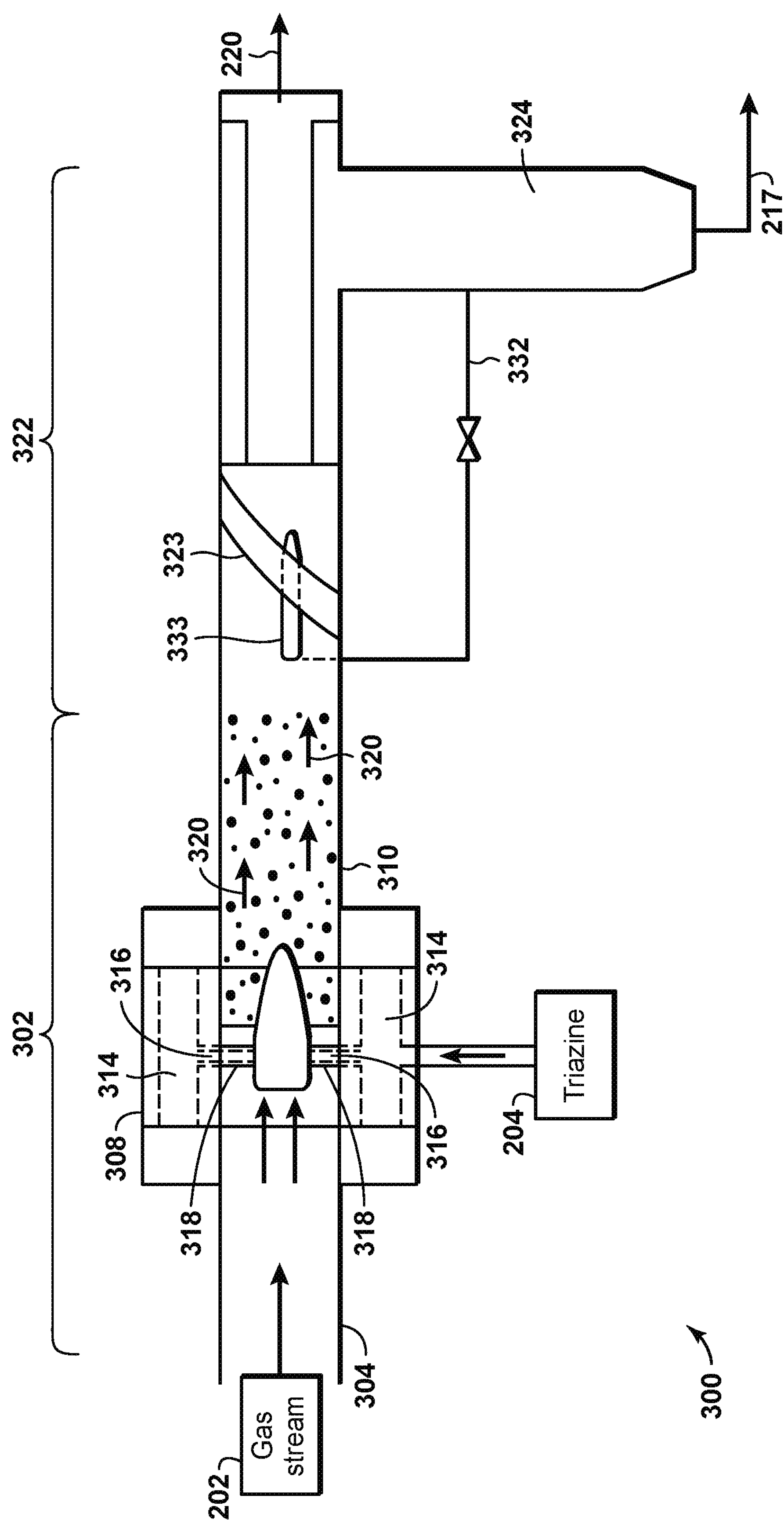
FIG. 3 is a detailed schematic diagram of a co-current contacting system according to disclosed aspects.

FIG. 3 illustrates the co-current contacting system 300 in further detail. The co-current contacting system 300 can provide for the separation of components within a gas stream, such as natural gas stream 202. The co-current contacting system 300 can include a co-current contactor 302 that is positioned in-line within a pipe 304. The co-current contactor 302 may include a number of components that provide for the efficient contacting of a liquid droplet stream, such as fresh triazine stream 204, with a flowing gas stream, such as natural gas stream 202, for the separation of hydrogen sulfide ($H_2S$) from the natural gas stream 202.

The co-current contactor 302 may include a droplet generator 308 and a mass transfer section 310. As shown in FIG. 3, the natural gas stream 202 may be flowed through the pipe 304 and into the droplet generator 308. The fresh triazine stream 204 may also be flowed into the droplet generator 308, for example, through a hollow space 314 coupled to flow channels 316 in the droplet generator 308.

From the flow channels 316, the fresh triazine stream 204 is released into the natural gas stream 202 as fine droplets through injection orifices 318, and is then flowed into the mass transfer section 310. This can result in the generation of a treated gas stream 320 within the mass transfer section 310. The treated gas stream 320 may include small liquid droplets dispersed in a gas phase. For $H_2S$ scavenging processes, the liquid droplets may include $H_2S$ molecules from the natural gas stream 202 that were absorbed or dissolved into the fresh triazine stream 204.

The treated gas stream 320 may be flowed from the mass transfer section 310 to a separation system 322, which includes a cyclonic separator 323 and a collector 324. Alternatively the separation system may include a mesh screen, or a settling vessel. Preferably, in-line cyclonic separators may be used to realize the benefits of compactness and reduced diameter. The cyclonic separator 323 removes the liquid droplets from the gas phase. The liquid triazine droplets, which as previously stated may include $H_2S$ absorbed or dissolved into the fresh triazine stream 204, are diverted into collector 324, which directs the collected liquids as the spent triazine stream 217 to the spent triazine tank 218 (FIG. 2). A gas purge line 332 may extend from the collector 324 and operates to re-inject gas present in the collector into the separation system 322. In an aspect, this gas is re-injected using a nozzle 333 or eductor situated inside the separation system 322. A processed gas stream 220, from which the $H_2S$-rich triazine has been separated, exits the separation system 322 in an in-line orientation with the pipe 304. The amount of $H_2S$ in processed gas stream 220, as measured in weight percentage, is lower than the amount of $H_2S$ in natural gas stream 202.

Figure 4A:
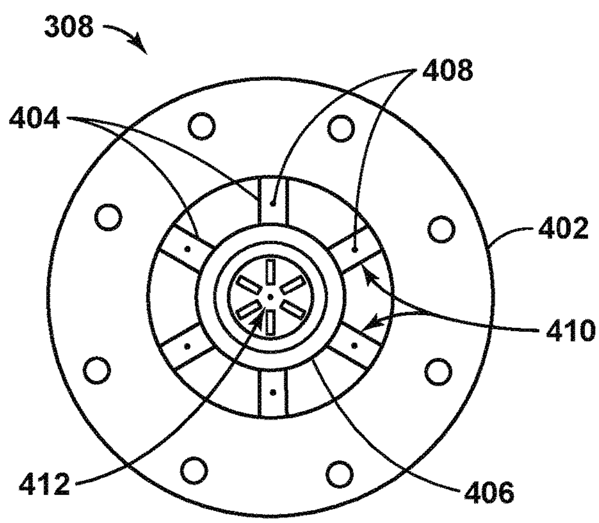
FIG. 4A is a front view of a droplet generator according to disclosed aspects.

FIG. 4A is a front view of droplet generator 308 according to disclosed aspects. The droplet generator 308 is a contacting device that may be implemented within a co-current contactor, for example, in the co-current contactor 302 described with respect to the co-current contacting system 300 of FIG. 3. The front view of the droplet generator 308 represents an upstream view of the droplet generator.

The droplet generator 308 may include an outer annular support ring 402, a number of spokes 404 extending from the annular support ring 402, and a gas entry cone 406. The annular support ring 402 may secure the droplet generator 308 in-line within the pipe. In addition, the spokes 404 may provide support for the gas entry cone 406.

The annular support ring 402 may be designed as a flanged connection, or as a removable or fixed sleeve inside the pipe. In addition, the annular support ring 402 may include a liquid feed system and a hollow channel described further with respect to FIGS. 4C and 4D. A liquid stream, such as fresh triazine stream 204, may be fed to the droplet generator 308 via the hollow channel in the annular support ring 402. The hollow channel may allow equal distribution of the liquid stream along the perimeter of the droplet generator 308.

Small liquid channels within the annular support ring 402 may provide a flow path for the fresh triazine stream to flow through liquid injection orifices 408 within the spokes 404. The liquid injection orifices 408 may be located on or near the leading edge of each spoke 404. Placement of the liquid injection orifices 408 on the spokes 404 may allow the triazine stream to be uniformly distributed in a gas stream that is directed between the spokes 404. Specifically, the fresh triazine stream may be contacted by the portion of the natural gas stream 202 flowing through the gaps between the spokes 404, and can be sheared into small droplets and entrained in the gas phase.

A portion of the natural gas stream flows between the spokes to the mass transfer section while the remainder of the gas stream flows into the gas entry cone 306 through a gas inlet 412. The gas entry cone 406 may block a cross-sectional portion of the pipe. The spokes 404 include gas exit slots 410 that allow the natural gas stream to be flowed out of the gas entry cone 406. This may increase the velocity of the natural gas stream as it flows through the pipe. The gas entry cone 406 may direct a predetermined amount of the natural gas stream to the gas exit slots 410 on the spokes 404.

Some of the fresh triazine stream injected through the spokes 404 may be deposited on the surface of the spokes 404 as a liquid film. As the natural gas stream flows through the gas entry cone 406 and is directed out of the gas exit slots 410 on the spokes 404, the natural gas stream may sweep, or blow, much of the liquid film off the surface of the spokes 404. This may enhance the dispersion of the fresh triazine stream into the gas phase. Further, the obstruction to the flow of the natural gas stream and the shearing effect created by the exit of the natural gas stream gas through the gas exit slots may provide a zone with an increased turbulent dissipation rate. This may result in the generation of smaller droplets that enhance the mass transfer rate between the fresh triazine stream and the natural gas stream.

The dimensions of various components of the droplet generator 308 may be varied such that the natural gas stream flows at a high velocity. This may be accomplished via either a sudden reduction in the diameter of the annular support ring 402 or a gradual reduction in the diameter of the annular support ring 402. The outer wall of the droplet generator 308 may be slightly converging in shape, terminating at the point where the natural gas stream and the fresh triazine stream are discharged into the downstream pipe. This can allow for the shearing and re-entrainment of any triazine film that is removed from the droplet generator 308. Further, a radial inward ring, grooved surface, or other suitable equipment may be included on the outer diameter of the droplet generator 308 near the point where the natural gas stream and the fresh triazine stream are discharged into the downstream pipe. This may enhance the degree of liquid entrainment within the gas phase.

The downstream end of the droplet generator 308 may discharge into a section of pipe (not shown). The section of pipe can be a straight section of pipe, or a concentrically expanding section of pipe. The gas entry cone 406 may terminate with a blunt ended cone or a tapered ended cone. In other aspects, the gas entry cone 406 can terminate with a ridged cone, which can include multiple concentric ridges along the cone that provide multiple locations for droplet generation. In addition, any number of gas exit slots 410 may be provided on the cone itself to allow for the removal of triazine film from the droplet generator 308.

Figure 4B:
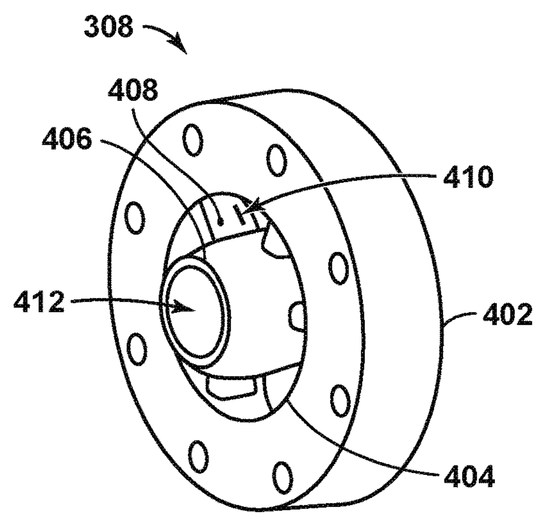
FIG. 4B is a side perspective view of the droplet generator of FIG. 4A.

FIG. 4B is a side perspective view of the droplet generator 308. Like numbered items are as described with respect to FIG. 4A. As shown in FIG. 4B, the upstream portion of the gas entry cone 406 may extend further into the pipe than the annular support ring 402 and the spokes 404 in the upstream direction. The downstream portion of the gas entry cone 406 can also extend further into the pipe than the annular support ring 402 and the spokes 404 in the downstream direction. The length of the gas entry cone 406 in the downstream direction depends on the type of cone at the end of the gas entry cone 406, as described further with respect to FIGS. 4C and 4D.

Figure 4C:
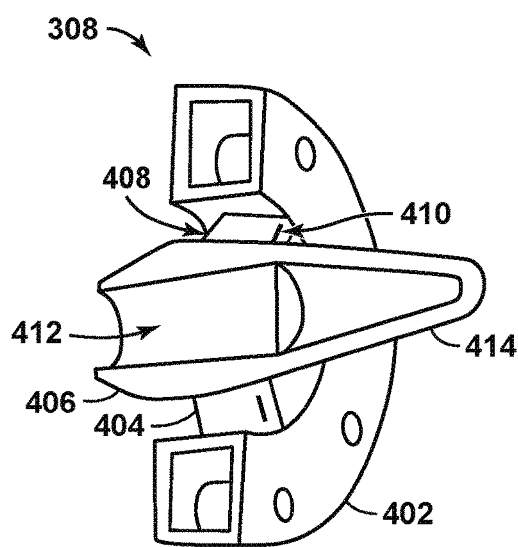
FIG. 4C is a cross-sectional side perspective view of the droplet generator of FIG. 4A according to disclosed aspects.

FIG. 4C is a cross-sectional side perspective view of the droplet generator 308 according to a disclosed aspect. Like numbered items are as described with respect to FIGS. 4A and 4B. According to FIG. 4C, the gas entry cone 406 of the droplet generator 308 terminates with a tapered ended cone 414. Terminating the gas entry cone 406 with a tapered ended cone 414 may reduce the overall pressure drop in the pipe caused by the droplet generator 308.

Figure 4D:
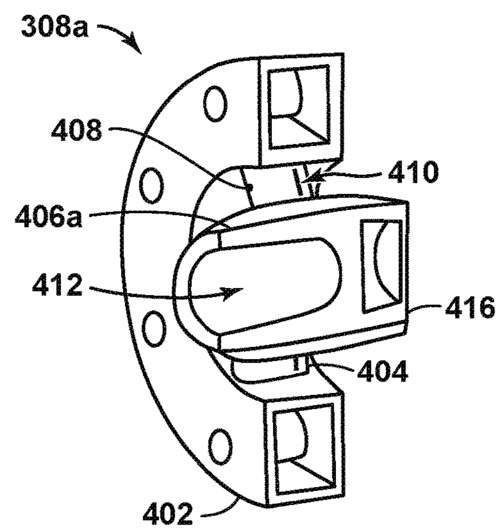
FIG. 4D is a another cross-sectional side perspective view of the droplet generator according to other disclosed aspects.

FIG. 4D is a cross-sectional side perspective view of the droplet generator 308*a* according to another disclosed aspect. Like numbered items are as described with respect to FIGS. 4A-4C. According to FIG. 4D, the gas entry cone 406*a* of the droplet generator 308*a* terminates with a blunt ended cone 416. Terminating the gas entry cone 406*a* with a blunt ended cone 416 may encourage droplet formation in the center of the pipe.

Figure 5:
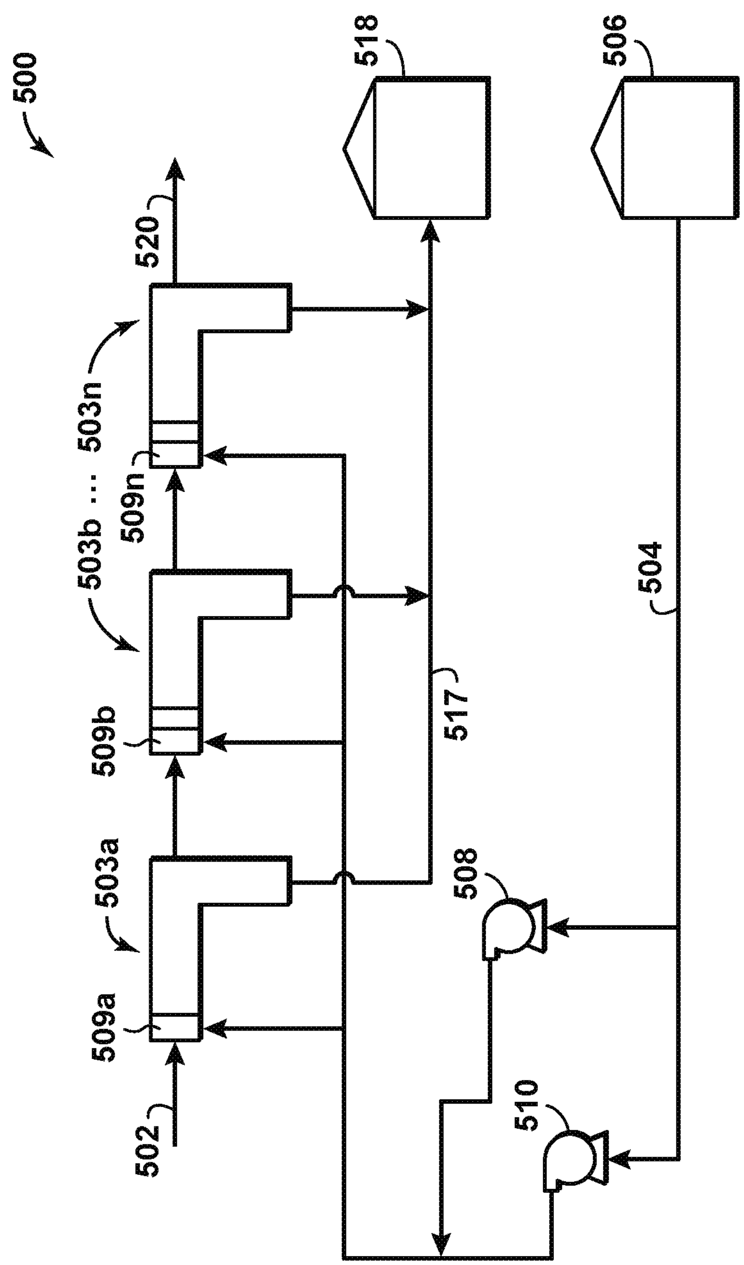
FIG. 5 is a schematic diagram of an $H_2S$ scavenging system using multiple co-current contacting systems according to disclosed aspects.

$H_2S$ scavenging system 200 employs one co-current contacting system 300. In some circumstances it may be desirable to use more than one co-current contacting system. FIG. 5 shows an $H_2S$ scavenging system 500 according to another aspect of the disclosure. As with $H_2S$ scavenging system 200, $H_2S$ scavenging system 500 uses a liquid $H_2S$ scavenger, such as triazine, to separate $H_2S$ from a natural gas stream 502 or other gas stream. A plurality of co-current contacting systems 503*a*, 503*b*, . . . 503*n* are arranged in series. The use of the letter nomenclature (i.e., 'a', 'b', 'n', etc.) in conjunction with the numerical reference characters herein is for ease of reference only and is not limiting. For example, those of skill in the art will understand that an illustrated set of co-current contacting systems 503*a*-503*n* may, in various aspects, comprise two, four, five, or more co-current contacting systems. Three co-current contacting systems are shown in FIG. 5. The gas stream exiting all but the last of the co-current contacting systems (i.e., 503*a*, 503*b*) is the gas stream inputted to the next respective co-current contacting system (i.e. 503*b*, 503*n*) and the gas stream exiting the last co-current contacting system 503*n* is a processed gas stream 520 having all or part of $H_2S$ removed therefrom. A fresh triazine stream 504 from a fresh triazine supply tank 506 is pumped, using parallel first and second pumps 508, 510, to be injected into each of the droplet generators 509*a*, 509*b*, . . . 509*n* associated with the respective co-current contacting systems 503*a*, 503*b*, . . . 503*n*. The liquid triazine/$H_2S$ mixture exits each co-current contacting system 503*a*, 503*b*, . . . 503*n* as a spent triazine stream 517 that is sent to a spent triazine tank 518 to be stored and/or disposed of.

Figure 6:
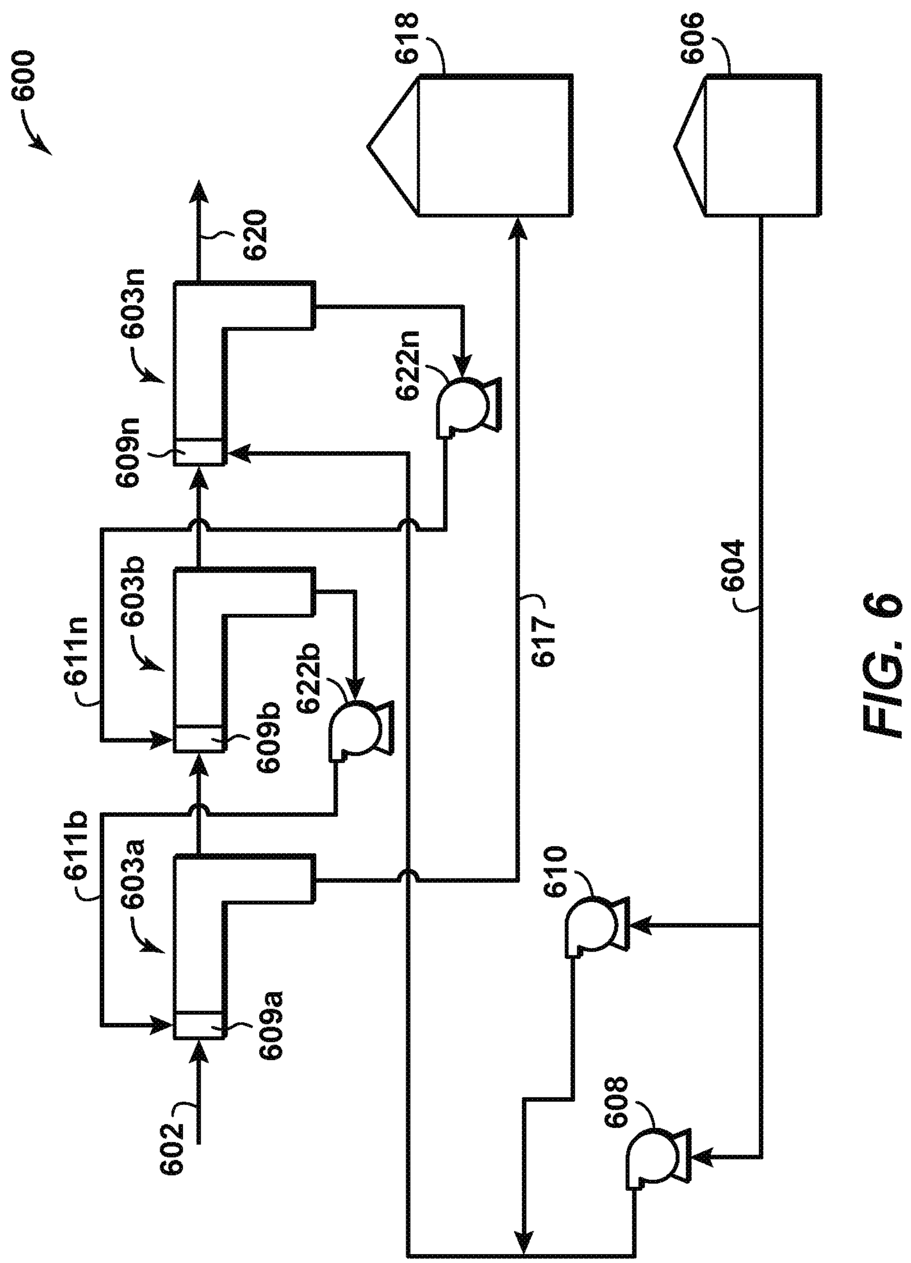
FIG. 6 is a schematic diagram of an $H_2S$ scavenging system using multiple co-current contacting systems according to other disclosed aspects.

The $H_2S$ scavenging system 500 can be termed a parallel liquid feed configuration because the fresh triazine stream 504 is fed to the droplet generators of each of the co-current contacting systems 503*a*, 503*b*, . . . 503*n*. FIG. 6 shows an $H_2S$ scavenging system 600 according to still another aspect of the disclosure, which may be termed a counter-current liquid feed configuration. As with $H_2S$ scavenging systems 200 and 500, $H_2S$ scavenging system 600 uses a liquid $H_2S$ scavenger, such as triazine, to separate $H_2S$ from a natural gas stream 602 or other gas stream. A plurality of co-current contacting systems 603*a*, 603*b*, . . . 603*n* are arranged in series. Three co-current contacting systems are shown in FIG. 6, although the use of greater or fewer numbers of co-current contacting systems is within the scope of the present disclosure. The gas stream exiting all but the last of the co-current contacting systems (i.e., 603*a*, 603*b*) is the gas stream inputted to the next respective co-current contacting system (i.e., 603*b*, 603*n*), and the gas stream exiting the last co-current contacting system 603*n* is a processed gas stream 620 having all or part of $H_2S$ removed therefrom. A fresh triazine stream 604 from a fresh triazine supply tank 606 is pumped, using parallel first and second pumps 608, 610, to be injected into the droplet generator 609*n* associated with the last co-current contacting system 603*n*. The liquid triazine/$H_2S$ mixture line 611*n* exiting the last co-current contacting system 603*n* is pumped using a pump 622*n*, optionally cooled using a cooler (not shown), and input into the droplet generator 609*b* of the co-current contacting system previous in series therewith (which in FIG. 6 is the second co-current contacting system 603*b*). The liquid triazine/$H_2S$ mixture line 611*b* exiting the second co-current contacting system 603*b* is pumped using a pump 622*b*, optionally cooled using a cooler (not shown), and input into the droplet generator 609*a* of the first co-current contacting system 603*a*. The liquid triazine/$H_2S$ mixture 617 exiting the first co-current contacting system 603*a* is a spent triazine stream 617 that is sent to a spent triazine tank 618 to be stored and/or disposed of. A flash tank (not shown) may be placed in each of lines 611*b*, 611*n* prior to the respective pumps 622*b*, 622*n*. In addition to avoiding cavitation in pumps 622*b*, 622*n*, it is possible that a small amount of carbon dioxide may flash (particularly if the semi-lean scavenger is let down to lower pressure) and a small amount of scavenger capacity may thus be recovered.

Figure 7:
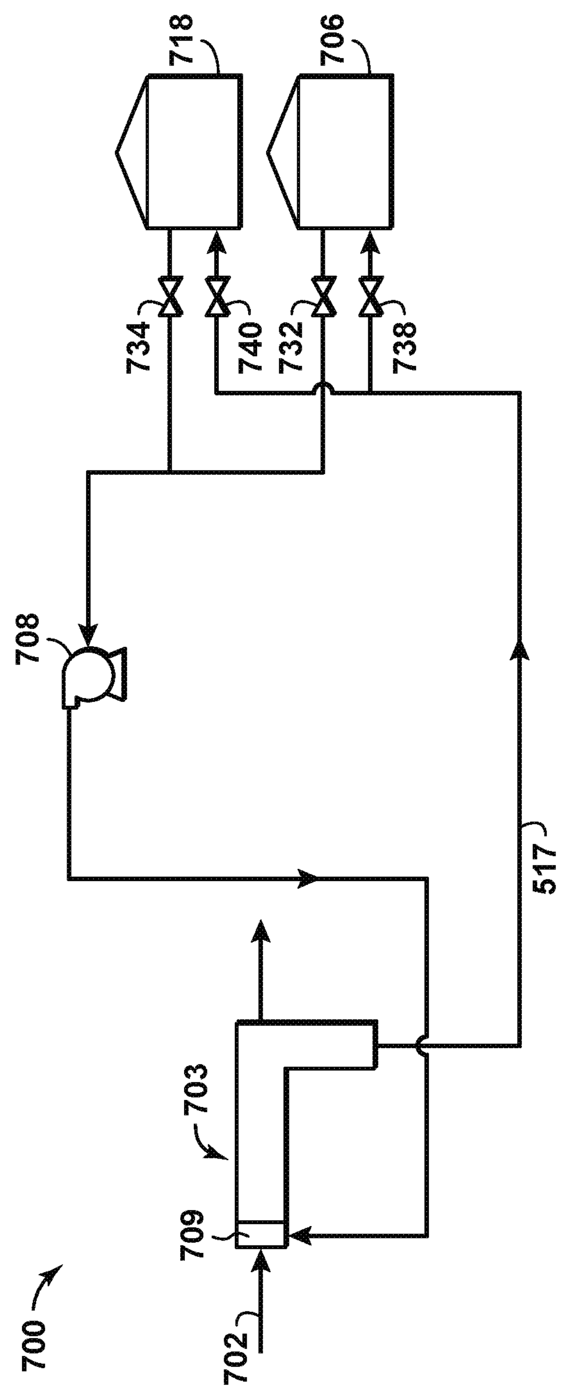
FIG. 7 is a schematic diagram of an $H_2S$ scavenging system according to disclosed aspects.

FIG. 7 illustrates an $H_2S$ scavenging system 700 according to another aspect of the disclosure. $H_2S$ scavenging system 700 permits one or more compact co-current contacting systems associated therewith to operate while re-circulating a non-regenerable liquid $H_2S$ scavenger chemical, e.g., triazine, for the removal of $H_2S$ from a natural gas stream 702. As shown in FIG. 7, first and second tanks 706, 718 are provided to store the non-regenerable liquid $H_2S$ scavenger. One or more pumps, represented by pump 708, pressurizes the liquid scavenger from the storage tanks to be injected into the droplet generator 709 of one or more co-current contacting systems, represented by co-current contacting system 703. Pump 708 can be configured to take suction from either first or second tank 706, 718 by opening/closing first and/or second isolation valves 732, 734. After interacting with the natural gas stream 702 in the co-current contacting system 703, the liquid scavenger is returned to either first tank 706 or second tank 718 by opening/closing third and/or fourth isolation valves 738, 740. Accordingly, $H_2S$ scavenging system 700 may be operated in the following modes:

- Mode 1: First tank re-circulation: liquid from first tank 706 is sent to co-current contacting system 703, and liquid from co-current contacting system 703 is returned to first tank 706.
- Mode 2: Second tank recirculation: liquid from second tank 718 is sent to co-current contacting system 703, and liquid from co-current contacting system 703 is returned to second tank 718.
- Mode 3: First tank once-through: liquid from first tank 706 is sent to co-current contacting system 703, and liquid from co-current contacting system 703 is sent to second tank 718.
- Mode 4: Second tank once-through: liquid from second tank 718 is sent to co-current contacting system 703, and liquid from co-current contacting system 703 is sent to first tank 706.

Modes 1 and 2 above allow for greater chemical utilization of the liquid scavenger compared to modes 3 and 4. For example, in mode 3 first tank 706 is the "Fresh chemical" storage tank and second tank 718 is the "Spent scavenger" or "waste" storage tank. The "waste" liquid stored in second tank has been used to treat the natural gas; however, the liquid scavenger may retain some amount of scavenging capacity to further treat the natural gas stream 702. In mode 1 described above, the "waste" liquid is re-used to treat the natural gas stream until such a point where the scavenging capacity of the liquid scavenger has been depleted, resulting in greater utilization of the liquid scavenger.

Another feature of the $H_2S$ scavenging system 700 is that continuous chemical treatment of the processed gas may be realized by utilizing the first and second storage tanks 706, 718. Specifically, with first and second tanks 706, 718 the process may be operated continuously while the tanks are in semi-batch operation. For example, in mode 1 discussed above the liquid scavenger in first tank 706 is used exclusively and will be consumed over time. First and third isolation valves 732, 738 are open and second and fourth isolation valves 734, 740 are closed. While operating with first tank 706, second tank 718 may be filled with fresh liquid scavenger. Upon nearing the useful operating life of the liquid scavenger in first tank 706, first and third isolation valves 732, 738 are closed and second and fourth isolation valves 734, 740 are opened. In this fashion, fresh liquid scavenger from second tank 718 may be pumped by pump 708 to be used by co-current contacting system 703. Then, the spent liquid scavenger in first tank 706 may be removed and replaced with fresh liquid scavenger. Upon nearing the useful operating life of the liquid scavenger in second tank 718, the tanks are again switched by reversing the opening/closing of the isolation valves such that first tank 706 is put back in service. This cycle may repeat indefinitely without requiring the scavenging process to shut down.

Figure 8:
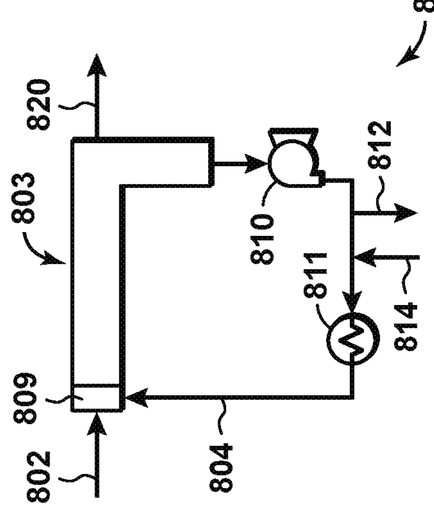
FIG. 8 is a schematic diagram of an $H_2S$ scavenging system according to still other disclosed aspects.

Many activated amine systems remove $CO_2$ to levels well below the 50 ppm specification for LNG, sometimes to 2-3 ppm $CO_2$ (and 2-3 ppm $H_2S$). With these very low levels of $H_2S$ and $CO_2$ in the treated gas, caustic could be used effectively as a scavenger to remove organic sulfur compounds such as mercaptans, with relatively little irreversible loss to bicarbonate and bisulfide. FIG. 8 shows an $H_2S$ scavenging system 800, including a co-current contacting system 803, that may be used for removal of mercaptans and other sulfur-containing compounds from a natural gas stream 802 or other gas stream. System 800 uses a liquid $H_2S$ scavenger, and preferably caustic, to separate the mercaptans and/or other sulfur-containing compounds from a natural gas stream 802. A caustic stream 804 is combined with the natural gas stream 802 in a droplet generator 809 of the co-current contacting system 803 according to previously disclosed principles. Co-current contacting system 803 and droplet generator 809 are similar in construction and operation to the co-current contacting systems and droplet generators respectively disclosed in previous Figures. The co-current contacting system 803 provides sufficient contacting time for the caustic to react and absorb part or all of the mercaptans and/or other sulfur-containing compounds in the natural gas stream 802. A processed gas stream 820, having had mercaptans and/or other sulfur-containing compounds removed therefrom, exits the co-current contacting system. The caustic, which now includes the mercaptans and may be termed spent caustic, exits the co-current contacting system 803 and is directed back to the droplet generator 809 after being pumped by a pump 810 and cooled by a cooler, heat exchanger, or cooling element 811. A spent caustic line 812 permits spent caustic to be selectively drawn off of the caustic stream 804 to be stored or otherwise disposed of. A fresh caustic line 814 permits fresh caustic to be injected into the caustic stream 804 to maintain the caustic stream 804 at a required amount for scavenging mercaptans or other sulfur-containing compounds in the natural gas stream 802.

Figure 9:
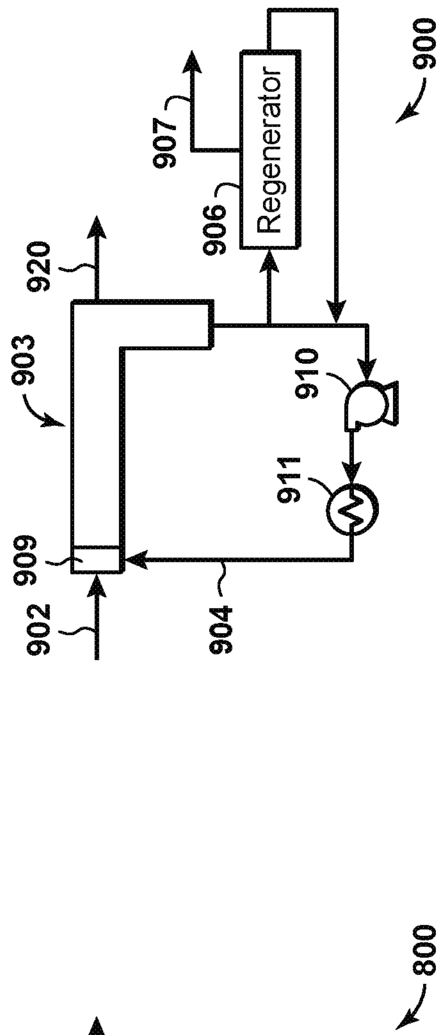
FIG. 9 is a schematic diagram of an $H_2S$ scavenging system according to still other disclosed aspects.

The reaction between the high-pH caustic and the mercaptans produces mercaptides. It is possible, therefore, to recycle and re-use the caustic by removing the mercaptides from the caustic. FIG. 9 shows an $H_2S$ scavenging system 900 according to another aspect of the disclosure, in which the caustic is regenerable and/or recyclable. $H_2S$ scavenging system 900 is similar to $H_2S$ scavenging system 800 as previously described, and is particularly suited for removal of mercaptans and other sulfur-containing compounds from a natural gas stream. A caustic stream 904 is combined with a natural gas stream 902 in a droplet generator 909 of a co-current contacting system 903 according to previously disclosed principles. Co-current contacting system 903 and droplet generator 909 are similar in construction and operation to the co-current contacting systems and droplet generators respectively disclosed in previous Figures. The co-current contacting system 903 provides sufficient contacting time for the caustic to react and produce mercaptides. A processed gas stream 920, free of the mercaptides and/or other sulfur-containing compounds, exits the co-current contacting system. Part or all of the spent caustic exiting the co-current contacting system 903 may be directed to a regenerator 906, where air reacts with the mercaptides to form disulfides. The disulfides form a liquid phase separate from the caustic and can be easily decanted from the caustic to form a disulfide stream 907. The regenerated (or fresh) caustic stream, having had mercaptans, mercaptides, and/or disulfides removed therefrom, may be returned to the caustic stream 904 to be re-used in the co-current contacting system 903. A pump 910 and a cooler, heat exchanger, or cooling element 911 may also be used to maintain the caustic stream 904 at the proper temperature and pressure for contacting and mixing with the natural gas stream 902.

Figure 10:
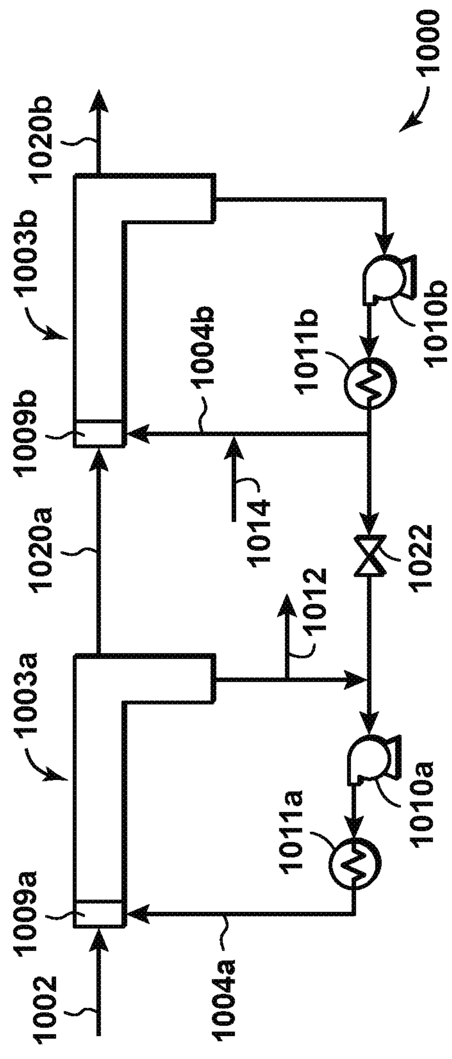
FIG. 10 is a schematic diagram of an $H_2S$ scavenging system according to yet other disclosed aspects.

FIGS. 8 and 9 disclose $H_2S$ scavenging systems that include a single co-current contacting system. It is within the scope of disclosure to include multiple co-current contacting systems in either of the disclosed $H_2S$ scavenging systems, either in series or in parallel. FIG. 10 shows a multistage $H_2S$ scavenging system 1000 that includes multiple co-current contacting systems—in the depicted aspect, first and second co-current contacting systems 1003*a*, 1003*b*—for removing mercaptans or other sulfur-containing compounds from a natural gas stream 1002 or other gas stream. Multistage $H_2S$ scavenging system 1000 is similar to $H_2S$ scavenging systems 800, 900 as previously described. A first caustic stream 1004*a* is combined with the natural gas stream 1002 in a droplet generator 1009*a* of the first co-current contacting system 1003*a* according to previously disclosed principles. A first processed gas stream 1020*a*, having had mercaptans, mercaptides, and/or other sulfur-containing compounds removed therefrom, exits the co-current contacting system. The caustic, which now includes the mercaptans, exits the first co-current contacting system 1003*a* and is directed back to the droplet generator 1009*a* after being pumped by a pump 1010*a* and cooled by a cooler, heat exchanger, or cooling element 1011*a*.

A second caustic stream 1004*b* is combined with the first processed gas stream 1020*a* in a droplet generator 1009*b* of the next co-current contacting system in series therewith, which in the depicted aspect is the second co-current contacting system 1003*b*. Second co-current contacting system 1003*b*, working according to previously disclosed principles, outputs a second processed gas stream 1020*b*, which is free of the mercaptans, mercaptides and/or other sulfur-containing compounds. The caustic, which now includes the mercaptans, mercaptides, and/or other sulfur-containing compounds, exits the second co-current contacting system 1003*b* and is directed back to the droplet generator 1009*b* after being pumped by a pump 1010*b* and cooled by a cooler, heat exchanger, or cooling element 1011*b*.

First and second caustic streams 1004*a*, 1004*b* are notionally configured to independently circulate in first and second co-current contacting systems 1003*a*, 1003*b*, respectively. However, to remove spent caustic and inject fresh caustic into system 1000, the first and second caustic streams 1004*a*, 1004*b* may be connected. A spent caustic stream 1012 may be selectively drawn off of the first caustic stream 1004*a* to be stored, regenerated, or otherwise disposed of, and a fresh caustic stream 1014 may be injected into the second caustic stream 1004*b*. A valve 1022 may be operated to separately connect the first and second caustic streams 1004*a*, 1004*b* when caustic is drawn off and/or injected, so that both caustic streams may be maintained at a sufficient volume and freshness to effectively scavenge mercaptans and/or other sulfur-containing compounds in the natural gas stream 1002 and/or the first processed gas stream 1020*a*.

The co-current contacting systems disclosed thus far have been depicted as serially arranged; however, multiple co-current contacting systems may be disposed in parallel in an $H_2S$ scavenging system. Such a parallel arrangement may permit the multiple co-current contacting systems to be disposed within a single larger pipe or vessel so that the co-current contacting systems are within a single pressure boundary. Such an arrangement is more fully described in co-owned U.S. Patent Application Publication No. US2016/0199774 titled "Separating Impurities from a Fluid Stream Using Multiple Co-current Contactors", the disclosure of which is incorporated herein by reference in its entirety.

The co-current contacting systems disclosed herein have been depicted in the Figures as being horizontally disposed. It is within the scope of the present disclosure for the $H_2S$ scavenging systems disclosed herein to use one or more vertically oriented co-current contacting systems as desired or required. Such vertically oriented co-current contacting systems may reduce the areal footprint of the $H_2S$ scavenging system, thereby increasing its utility in applications or situations where space is at a premium.

Figure 11:
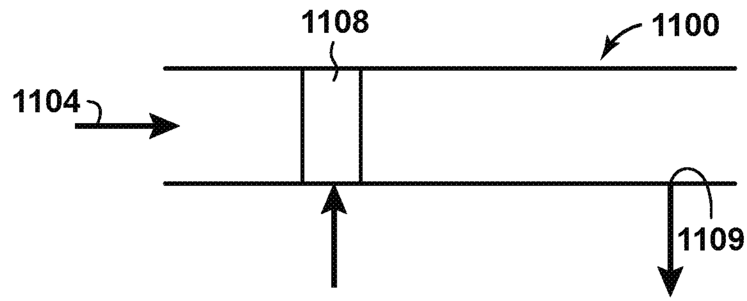
FIG. 11 is a side elevational view of an $H_2S$ scavenging system according to still other disclosed aspects.

Aspects of the disclosure have thus far demonstrated the use and benefit of co-current contacting systems in for $H_2S$ scavenging operations in continuous contact systems. It is also possible to use part of the disclosed co-current contacting system to increase efficiency of direct injection-based scavenging processes. FIG. 11 schematically depicts a portion of a natural gas pipeline 1100 in which a droplet generator 1108 is installed. Droplet generator 1108 is similar to the droplet generator 308 described previously. Droplet generator 1108 mixes a natural gas stream 1104 with a liquid scavenger, such as triazine, as previously disclosed. The liquid scavenger may then exit the natural gas pipeline 1100 through a drain 1109 disposed an appropriate distance downstream of the droplet generator. The droplet generator improves the efficiency of mixing between the natural gas stream and the liquid scavenger, thereby reducing the amount of liquid scavenger required for an application.

Figure 12:
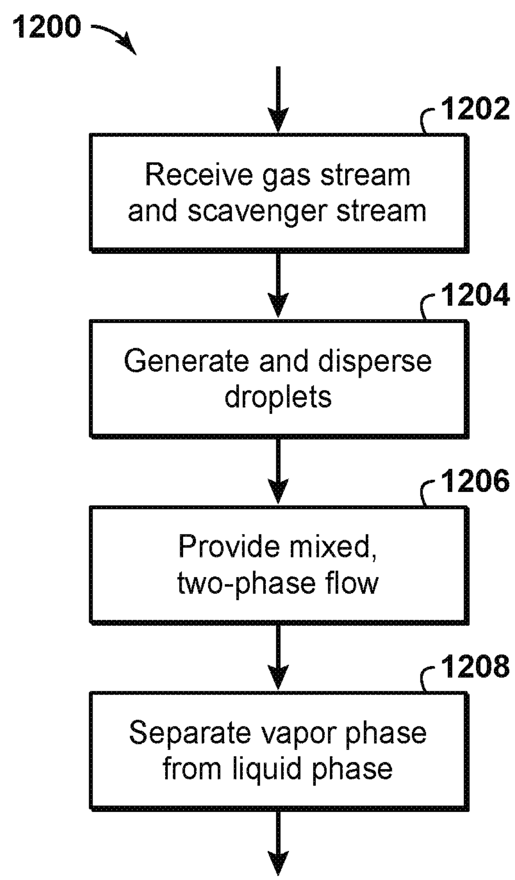
FIG. 12 is a process flow diagram of a method of scavenging $H_2S$ from a gas stream according to disclosed aspects.

FIG. 12 is a method 1200 of removing $H_2S$, mercaptans, and/or other sulfur-containing compounds from a natural gas stream according to aspects of the disclosure. At block 1202 the natural gas stream and a liquid scavenger stream are received in a co-current contacting system located in-line within a pipe. The co-current contacting system includes a droplet generator and a mass transfer section. At block 1204, using the droplet generator, droplets are generated from the liquid scavenger stream and dispersed into the natural gas stream. At block 1206, using the mass transfer section, a mixed, two-phase flow is provided having a vapor phase and a liquid phase. The liquid phase includes the liquid scavenger stream with $H_2S$, mercaptans, and/or other sulfur-containing compounds absorbed from the natural gas stream, and the vapor phase includes the natural gas stream. At block 1208 the vapor phase is separated from the liquid phase.

The disclosed aspects may be varied in many ways. For example, the compact co-current contacting systems have been shown in the Figures as being connected to each other in series, but for additional turndown flexibility one or more of the compact co-current contacting systems may be connected to each other in parallel. The separation systems disclosed herein may also be varied. Instead of the disclosed single cyclonic separator, in-line demisting cyclones may be used. Other known mist-eliminating devices may replace the cyclonic separator. The methods, processes, and/or functions described herein can be implemented and/or controlled by a computer system appropriately programmed. Additionally, non-triazine $H_2S$ scavengers may be used with the disclosed aspects.

Moreover, it is contemplated that features from various examples described herein can be combined together, including some but not necessarily all the features provided for given examples. Furthermore, the features of any particular example are not necessarily required to implement the present technological advancement.

The disclosed aspects replace the large diameter contactor and separator of known continuous contact systems (FIG. 1). An advantage of the disclosed aspects is that the co-current contacting systems can be horizontally oriented, vertically oriented, or in a mixed orientation as required or desired to best meet the limitations of an existing plot or module space. Other advantages of the disclosed aspects may be seen through reduced capital costs and potentially enhanced processing capacity in space-limited retrofit and de-bottlenecking opportunities. A typical contactor or separator may have, for example, a diameter of 4.2 m, approximately 12.6 m height (including a flash zone) and 105 mm wall thickness, and the disclosed co-current contacting system may be enclosed in a pipe having a 24 inch (60.96 cm) diameter. This may result in an approximately 75% reduction in capital expenditures, not to mention additional savings in transportation, civil and structural supports, when compared to known contactors and separators.

Aspects of the disclosure may include any combinations of the methods and systems shown in the following numbered paragraphs. This is not to be considered a complete listing of all possible aspects, as any number of variations can be envisioned from the description above.

1. A hydrogen sulfide ($H_2S$) scavenging system for removing $H_2S$, mercaptans, and/or other sulfur-containing compounds from a natural gas stream, comprising:

a liquid scavenger stream;

a co-current contacting system located in-line within a pipe, the co-current contacting system receiving the natural gas stream and the liquid scavenger stream, the co-current contacting system including:

a co-current contactor including a droplet generator and a mass transfer section, the droplet generator configured to generate droplets from the liquid scavenger stream and to disperse the droplets into the natural gas stream, and the mass transfer section configured to provide a mixed, two-phase flow having a vapor phase and a liquid phase, wherein the liquid phase includes the liquid scavenger stream with $H_2S$, mercaptans, and/or other sulfur-containing compounds absorbed from the natural gas stream, and wherein the vapor phase includes the natural gas stream; and a separation system configured to separate the vapor phase from the liquid phase.

2. The $H_2S$ scavenging system of paragraph 1, further comprising:

a storage tank that stores the liquid scavenger stream.

3. The $H_2S$ scavenging system of paragraph 2, wherein the storage tank is a first storage tank, and further comprising a second storage tank that stores the liquid phase after the liquid phase exits the co-current contacting system.

4. The $H_2S$ scavenging system of paragraph 2, wherein the storage tank is a first storage tank having an outlet connected to the droplet generator and an inlet connected to a liquid outlet of the separation system, and further comprising a second storage tank having an outlet connected to the droplet generator and an inlet connected to the liquid outlet of the separation system.

5. The $H_2S$ scavenging system of paragraph 4, wherein the outlet of the first storage tank is connected to the droplet generator through a first isolation valve, the outlet of the second storage tank is connected to the droplet generator through a second isolation valve, the inlet of the first storage tank is connected to the liquid outlet of the separation system through a third isolation valve, and the inlet of the second storage tank is connected to the liquid outlet of the separation system through a fourth isolation valve.

6. The $H_2S$ scavenging system of paragraph 1, wherein the scavenging liquid is one of triazine and caustic.

7. The $H_2S$ scavenging system of paragraph 1, wherein the droplet generator comprises:

an annular support ring securing the droplet generator in-line within the pipe;

a plurality of spokes extending from the annular support ring, the annular support ring having a plurality of liquid channels configured to allow the liquid scavenger stream to flow through the plurality of spokes and out of injection orifices disposed on the plurality of spokes; and a gas entry cone supported by the plurality of spokes and configured to allow a first portion of the natural gas stream to flow through a hollow section of the gas entry cone and through gas exit slots included in the plurality of spokes, and a second portion of the natural gas stream to flow around the gas entry cone and between the plurality of spokes, wherein the second portion of the natural gas stream is separate from the first portion of the gas stream.

8. The $H_2S$ scavenging system of paragraph 6, wherein a downstream portion of the gas entry cone comprises one of a blunt ended cone and a tapered ended cone.

9. The $H_2S$ scavenging system of any of paragraphs 1-8, wherein the separation system of the co-current contacting system comprises a cyclonic separator.

10. The $H_2S$ scavenging system of any of paragraphs 1-9, wherein the co-current contacting system is one of a plurality of co-current contacting systems connected in series, said plurality of co-current contacting systems including a last co-current contacting system;

wherein each of the plurality of co-current contacting system comprises a co-current contactor including a droplet generator and a mass transfer section, the droplet generator configured to generate droplets of the liquid scavenger and to disperse the droplets into a gas stream received from a previous co-current contacting system, and the mass transfer section configured to provide a mixed, two-phase flow having a vapor phase and a liquid phase; and a separation system configured to separate the vapor phase from the liquid phase, wherein the vapor phase comprises a processed gas stream and the liquid phase comprises the liquid from which droplets are generated in a co-current contactor of a previous co-current contacting system.

11. The $H_2S$ scavenging system of paragraph 1, wherein the liquid phase exiting the separation system comprises the liquid scavenger stream received by the co-current contacting system.

12. The $H_2S$ scavenging system of paragraph 11, further comprising:

a spent scavenger line for removing part of the liquid scavenger stream prior to being received by the co-current contacting system; and a fresh scavenger line for injecting fresh scavenger liquid into the liquid scavenger stream prior to being received by the co-current contacting system;

wherein the liquid scavenger stream comprises caustic.

13. The $H_2S$ scavenging system of paragraph 12, further comprising:

a scavenger regenerator connected to the spent scavenger line, the scavenger regenerator configured to remove $H_2S$, mercaptans, mercaptides, disulfides, and/or other sulfur-containing compounds from the removed part of the liquid scavenger stream to produce a regenerated scavenger, the scavenger regenerator further configured to return the regenerated scavenger to the liquid scavenger stream through the fresh scavenger line.

14. A method of removing $H_2S$, mercaptans, and/or other sulfur-containing compounds from a natural gas stream, comprising:

receiving the natural gas stream and a liquid scavenger stream in a co-current contacting system located in-line within a pipe, the co-current contacting system including a droplet generator and a mass transfer section;

using the droplet generator, generating droplets from the liquid scavenger stream and dispersing the droplets into the natural gas stream;

using the mass transfer section, providing a mixed, two-phase flow having a vapor phase and a liquid phase, wherein the liquid phase includes the liquid scavenger stream with $H_2S$, mercaptans, and/or other sulfur-containing compounds absorbed from the natural gas stream, and wherein the vapor phase includes the natural gas stream; and separating the vapor phase from the liquid phase.

15. The method of paragraph 14, further comprising:

storing the liquid scavenger stream in a storage tank.

16. The method of paragraph 15, wherein the storage tank is a first storage tank, and further comprising:

storing the liquid phase in a second storage tank after the liquid phase exits the co-current contacting system.

17. The method of paragraph 15, wherein the storage tank is a first storage tank, and further comprising:

connecting an outlet of the first storage tank to the droplet generator;

connecting an inlet of the first storage tank to a liquid outlet of the separation system;

connecting an outlet of a second storage tank to the droplet generator; and connecting an inlet of the second storage tank to the liquid outlet of the separation system.

18. The method of paragraph 17, wherein the outlet of the first storage tank is connected to the droplet generator through a first isolation valve, the outlet of the second storage tank is connected to the droplet generator through a second isolation valve, the inlet of the first storage tank is connected to the liquid outlet of the separation system through a third isolation valve, and the inlet of the second storage tank is connected to the liquid outlet of the separation system through a fourth isolation valve.

19. The method of paragraph 14, wherein the scavenging liquid is one of triazine and caustic.

20. The method of paragraph 14, wherein the droplet generator comprises:

an annular support ring securing the droplet generator in-line within the pipe;

a plurality of spokes extending from the annular support ring, the annular support ring having a plurality of liquid channels allowing the liquid scavenger stream to flow through the plurality of spokes and out of injection orifices disposed on the plurality of spokes; and a gas entry cone supported by the plurality of spokes and allowing a first portion of the natural gas stream to flow through a hollow section of the gas entry cone and through gas exit slots included in the plurality of spokes, and a second portion of the natural gas stream to flow around the gas entry cone and between the plurality of spokes, wherein the second portion of the natural gas stream is separate from the first portion of the gas stream.

21. The method of any of paragraphs 14-20, wherein the co-current contacting system is one of a plurality of co-current contacting systems connected in series, said plurality of co-current contacting systems including a last co-current contacting system;

wherein each of the plurality of co-current contacting system comprises a co-current contactor including a droplet generator and a mass transfer section, the droplet generator generating droplets of the liquid scavenger and dispersing the droplets into a gas stream received from a previous co-current contacting system, and the mass transfer section providing a mixed, two-phase flow having a vapor phase and a liquid phase; and a separation system that separates the vapor phase from the liquid phase, wherein the vapor phase includes a processed gas stream and the liquid phase includes the liquid from which droplets are generated in a co-current contactor of a previous co-current contacting system.

22. The method of paragraph 14, wherein the liquid phase exiting the separation system comprises the liquid scavenger stream received by the co-current contacting system.

23. The method of paragraph 22, further comprising:

removing part of the liquid scavenger stream prior to being received by the co-current contacting system; and injecting fresh scavenger liquid into the liquid scavenger stream prior to being received by the co-current contacting system;

wherein the liquid scavenger stream comprises caustic.

24. The method of paragraph 23, further comprising:

in a scavenger regenerator, removing $H_2S$, mercaptans, mercaptides, disulfides, and/or other sulfur-containing compounds from the removed part of the liquid scavenger stream, thereby producing a regenerated scavenger; and returning the regenerated scavenger to the liquid scavenger stream.

While the present techniques can be susceptible to various modifications and alternative forms, the examples described above are non-limiting. It should again be understood that the techniques is not intended to be limited to the particular embodiments disclosed herein. Indeed, the present techniques include all alternatives, modifications, and equivalents falling within the true spirit and scope of the appended claims.

What is claimed is:

1. A hydrogen sulfide ($H_2S$) scavenging system for removing $H_2S$, mercaptans, and/or other sulfur-containing compounds from a natural gas stream, comprising:

a liquid scavenger stream, wherein the liquid scavenger stream comprises caustic;

a co-current contacting system located in-line within a pipe, the co-current contacting system receiving the natural gas stream and the liquid scavenger stream, the co-current contacting system including:

a co-current contactor including a droplet generator and a mass transfer section, the droplet generator configured to generate droplets from the liquid scavenger stream and to disperse the droplets into the natural gas stream, and the mass transfer section configured to provide a mixed, two-phase flow having a vapor phase and a liquid phase, wherein the liquid phase includes the liquid scavenger stream with $H_2S$, mercaptans, and/or other sulfur-containing compounds absorbed from the natural gas stream, and wherein the vapor phase includes the natural gas stream; and a separation system configured to separate the vapor phase from the liquid phase;

wherein the liquid phase exiting the separation system comprises the liquid scavenger stream received by the co-current contacting system;

the $H_2S$ scavenging system further comprising:

a spent scavenger line for removing part of the liquid scavenger stream prior to being received by the co-current contacting system;

a fresh scavenger line for injecting fresh scavenger liquid into the liquid scavenger stream prior to being received by the co-current contacting system; and a scavenger regenerator connected to the spent scavenger line, the scavenger regenerator configured to remove $H_2S$, mercaptans, mercaptides, disulfides, and/or other sulfur-containing compounds from the removed part of the liquid scavenger stream to produce a regenerated scavenger, the scavenger regenerator further configured to return the regenerated scavenger to the liquid scavenger stream through the fresh scavenger line.

2. The $H_2S$ scavenging system of claim 1, further comprising:

a storage tank that stores the liquid scavenger stream.

3. The $H_2S$ scavenging system of claim 2, wherein the storage tank is a first storage tank, and further comprising a second storage tank that stores the liquid phase after the liquid phase exits the co-current contacting system.

4. The $H_2S$ scavenging system of claim 2, wherein the storage tank is a first storage tank having an outlet connected to the droplet generator and an inlet connected to a liquid outlet of the separation system, and further comprising a second storage tank having an outlet connected to the droplet generator and an inlet connected to the liquid outlet of the separation system.

5. The $H_2S$ scavenging system of claim 4, wherein the outlet of the first storage tank is connected to the droplet generator through a first isolation valve, the outlet of the second storage tank is connected to the droplet generator through a second isolation valve, the inlet of the first storage tank is connected to the liquid outlet of the separation system through a third isolation valve, and the inlet of the second storage tank is connected to the liquid outlet of the separation system through a fourth isolation valve.

6. The $H_2S$ scavenging system of claim 1, wherein the droplet generator comprises:

an annular support ring securing the droplet generator in-line within the pipe;

a plurality of spokes extending from the annular support ring, the annular support ring having a plurality of liquid channels configured to allow the liquid scavenger stream to flow through the plurality of spokes and out of injection orifices disposed on the plurality of spokes; and a gas entry cone supported by the plurality of spokes and configured to allow a first portion of the natural gas stream to flow through a hollow section of the gas entry cone and through gas exit slots included in the plurality of spokes, and a second portion of the natural gas stream to flow around the gas entry cone and between the plurality of spokes, wherein the second portion of the natural gas stream is separate from the first portion of the gas stream;

wherein a downstream portion of the gas entry cone comprises one of a blunt ended cone and a tapered ended cone.

7. The $H_2S$ scavenging system of claim 1, wherein the separation system of the co-current contacting system comprises a cyclonic separator.

8. The $H_2S$ scavenging system of claim 1, wherein the co-current contacting system is one of a plurality of co-current contacting systems connected in series, said plurality of co-current contacting systems including a last co-current contacting system;

wherein each of the plurality of co-current contacting system comprises a co-current contactor including a droplet generator and a mass transfer section, the droplet generator configured to generate droplets of the liquid scavenger and to disperse the droplets into a gas stream received from a previous co-current contacting system, and the mass transfer section configured to provide a mixed, two-phase flow having a vapor phase and a liquid phase; and a separation system configured to separate the vapor phase from the liquid phase, wherein the vapor phase comprises a processed gas stream and the liquid phase comprises the liquid from which droplets are generated in a co-current contactor of a previous co-current contacting system.

9. A method of removing $H_2S$, mercaptans, and/or other sulfur-containing compounds from a natural gas stream, comprising:

receiving the natural gas stream and a liquid scavenger stream in a co-current contacting system located in-line within a pipe, the co-current contacting system including a droplet generator and a mass transfer section, wherein the liquid scavenger stream comprises caustic;

using the droplet generator, generating droplets from the liquid scavenger stream and dispersing the droplets into the natural gas stream;

using the mass transfer section, providing a mixed, two-phase flow having a vapor phase and a liquid phase, wherein the liquid phase includes the liquid scavenger stream with $H_2S$, mercaptans, and/or other sulfur-containing compounds absorbed from the natural gas stream, and wherein the vapor phase includes the natural gas stream; and separating the vapor phase from the liquid phase;

wherein the liquid phase exiting the separation system comprises the liquid scavenger stream received by the co-current contacting system;

the method further comprising removing part of the liquid scavenger stream prior to being received by the co-current contacting system;

injecting fresh scavenger liquid into the liquid scavenger stream prior to being received by the co-current contacting system;

in a scavenger regenerator, removing $H_2S$, mercaptans, mercaptides, disulfides, and/or other sulfur-containing compounds from the removed part of the liquid scavenger stream, thereby producing a regenerated scavenger; and returning the regenerated scavenger to the liquid scavenger stream.

10. The method of claim 9, further comprising:

storing the liquid scavenger stream in a first storage tank; and storing the liquid phase in a second storage tank after the liquid phase exits the co-current contacting system.

11. The method of claim 9, further comprising:

storing the liquid scavenger stream in a first storage tank;

connecting an outlet of the first storage tank to the droplet generator;

connecting an inlet of the first storage tank to a liquid outlet of the separation system;

connecting an outlet of a second storage tank to the droplet generator; and connecting an inlet of the second storage tank to the liquid outlet of the separation system.

12. The method of claim 11, wherein the outlet of the first storage tank is connected to the droplet generator through a first isolation valve, the outlet of the second storage tank is connected to the droplet generator through a second isolation valve, the inlet of the first storage tank is connected to the liquid outlet of the separation system through a third isolation valve, and the inlet of the second storage tank is connected to the liquid outlet of the separation system through a fourth isolation valve.

13. The method of claim 9, wherein the droplet generator comprises:

an annular support ring securing the droplet generator in-line within the pipe;

a plurality of spokes extending from the annular support ring, the annular support ring having a plurality of liquid channels allowing the liquid scavenger stream to flow through the plurality of spokes and out of injection orifices disposed on the plurality of spokes; and a gas entry cone supported by the plurality of spokes and allowing a first portion of the natural gas stream to flow through a hollow section of the gas entry cone and through gas exit slots included in the plurality of spokes, and a second portion of the natural gas stream to flow around the gas entry cone and between the plurality of spokes, wherein the second portion of the natural gas stream is separate from the first portion of the gas stream.

14. The method of claim 9, wherein the co-current contacting system is one of a plurality of co-current contacting systems connected in series, said plurality of co-current contacting systems including a last co-current contacting system;

wherein each of the plurality of co-current contacting system comprises a co-current contactor including a droplet generator and a mass transfer section, the droplet generator generating droplets of the liquid scavenger and dispersing the droplets into a gas stream received from a previous co-current contacting system, and the mass transfer section providing a mixed, two-phase flow having a vapor phase and a liquid phase; and a separation system that separates the vapor phase from the liquid phase, wherein the vapor phase includes a processed gas stream and the liquid phase includes the liquid from which droplets are generated in a co-current contactor of a previous co-current contacting system.

* * * * *